US012707348B2

(12) United States Patent
Abouzeid et al.

(10) Patent No.: US 12,707,348 B2
(45) Date of Patent: Aug. 11, 2026

(54) MITIGATION OF MULTIPLE CONFLICTING HANDOVERS

(71) Applicant: Dell Products L.P., Round Rock, TX (US)

(72) Inventors: Mohamed Abouzeid, El Sheikh Zayed (EG); Medhat Khalifa, Giza (EG); Mariam Basili, Safir (EG); Joy Amir, Ard el Golf (EG); Amgad Ahmed, Nasr (EG); Abdullah Mohamed, Cairo (EG)

(73) Assignee: Dell Products L.P., Round Rock, TX (US)

( * ) Notice: Subject to any disclaimer, the term of this patent is extended or adjusted under 35 U.S.C. 154(b) by 346 days.

(21) Appl. No.: 18/588,838

(22) Filed: Feb. 27, 2024

(65) Prior Publication Data

US 2025/0274824 A1 Aug. 28, 2025

(51) Int. Cl.

| | |
|---|---|
| ***H04W 36/00*** | (2009.01) |
| ***H04W 24/02*** | (2009.01) |
| ***H04W 28/086*** | (2023.01) |
| ***H04W 36/30*** | (2009.01) |

(52) U.S. Cl.

CPC ....... *H04W 36/0079* (2018.08); *H04W 24/02* (2013.01); *H04W 28/0861* (2023.05); *H04W 36/30* (2013.01)

(58) Field of Classification Search

CPC .. H04L 41/0823; H04W 16/18; H04W 24/02; H04W 28/0861–0865; H04W 36/0079; H04W 36/0083; H04W 36/30–305; H04W 76/18; H04W 88/18

See application file for complete search history.

(56) References Cited

U.S. PATENT DOCUMENTS

2025/0119969 A1 * 4/2025 Park ...................... H04W 24/02

FOREIGN PATENT DOCUMENTS

EP 2291028 A1 * 3/2011 ............ H04W 36/02

OTHER PUBLICATIONS

"O-RAN Alliance." [https://www.o-ran.org/] retrieved Jan. 26, 2026, 7 pages.
"Telecom Infra Project—OpenRAN." [https://www.telecominfraproject.com/openran] retrieved Jan. 26, 2026, 11 pages.

* cited by examiner

*Primary Examiner* — Thomas R Cairns

(74) *Attorney, Agent, or Firm* — Amin, Turocy & Watson, LLP

(57) ABSTRACT

Enhanced management of conflicting handovers of a device between cells can be performed. Conflicting handover (CH) detector can detect conflicting handovers of the device between first cell and second cell based on handover information relating to previous handovers of device between cells, first performance indicators (PIs) associated with device and first cell, second PIs associated with device and second cell, and/or third PIs associated with second devices associated with first or second cell, over defined time period. In response to conflicting handovers detection, CH identifier can predict, from a group of types of conflicting handovers of devices, a type of the conflicting handovers of the device between first and second cells based on handover information, first PIs, second PIs, and/or third PIs. CH mitigator can determine the better of first cell or second cell to which to connect device based on rules and first, second, and/or third PIs.

20 Claims, 12 Drawing Sheets

HANDOVER MANAGEMENT COMPONENT
126

CH DETECTOR COMPONENT
204

MACHINE LEARNING CH DETECTOR MODEL(S)
214

CH IDENTIFIER COMPONENT
206

MACHINE LEARNING CH IDENTIFIER MODEL(S)
216

CH MITIGATOR COMPONENT
208

RULES
218

AI COMPONENT
210

TRAINER COMPONENT
212

MACHINE LEARNING CH DETECTOR MODEL(S)
214

MACHINE LEARNING CH IDENTIFIER MODEL(S)
216

FEEDBACK COMPONENT
222

PROCESSOR COMPONENT
220

DATA STORE
202

BASE STATION

COMMUNICATION PLATFORM

708

ANTENNA 1

$769_1$

ANTENNA 2

$769_2$

ANTENNA *R*

$769_R$

RECEIVER

TRANSMITTER

710

MUX/DEMUX

712

MOD/DEMOD

714

DATA STORE

718

PROCESSOR

716

CU-CP NODE

702

DU

704

CU-UP NODE

706

DEVICE

APPLICATIONS 806

CLIENT (STORE, DISCOVERY, PLAY) 842

TRIGGER COMPONENT 838

HYSTERESIS COMPONENT 836

SIP CLIENT 840

FIRMWARE 808

VIDEO COMP 830

DISPLAY 812

CAMERA 822

SERIAL I/O INTERFACE 814

USER INPUT 834

PROCESSOR 802

MEMORY 804

AUDIO I/O 816

SUBSCRIBER IDENTITY SYSTEM 818 820

COMMUNICATION COMPONENT 810

CELL TCVR 811

WIFI TCVR 813

LOCATION COMPONENT 832

POWER SOURCE 824

POWER I/O 826

DETERMINING THERE ARE CONFLICTING HANDOVERS OF A DEVICE BETWEEN A FIRST CELL AND A SECOND CELL BASED ON HANDOVER INFORMATION RELATING TO PREVIOUS HANDOVERS OF THE DEVICE BETWEEN CELLS, FIRST PERFORMANCE INDICATORS ASSOCIATED WITH THE DEVICE AND THE FIRST CELL, SECOND PERFORMANCE INDICATORS ASSOCIATED WITH THE DEVICE AND THE SECOND CELL, AND/OR THIRD PERFORMANCE INDICATORS ASSOCIATED WITH ONE OR MORE SECOND DEVICES ASSOCIATED WITH THE FIRST CELL AND/OR SECOND CELL, OVER A DEFINED TIME PERIOD

902

IN RESPONSE TO DETERMINING THAT THERE ARE THE CONFLICTING HANDOVERS OF THE DEVICE BETWEEN THE FIRST CELL AND THE SECOND CELL, FROM A GROUP OF TYPES OF CONFLICTING HANDOVERS OF DEVICES, PREDICTING A TYPE OF THE CONFLICTING HANDOVERS OF THE DEVICE BETWEEN THE FIRST CELL AND THE SECOND CELL BASED AT LEAST IN PART ON THE HANDOVER INFORMATION, THE FIRST PERFORMANCE INDICATORS, THE SECOND PERFORMANCE INDICATORS, AND/OR THE THIRD PERFORMANCE INDICATORS

904

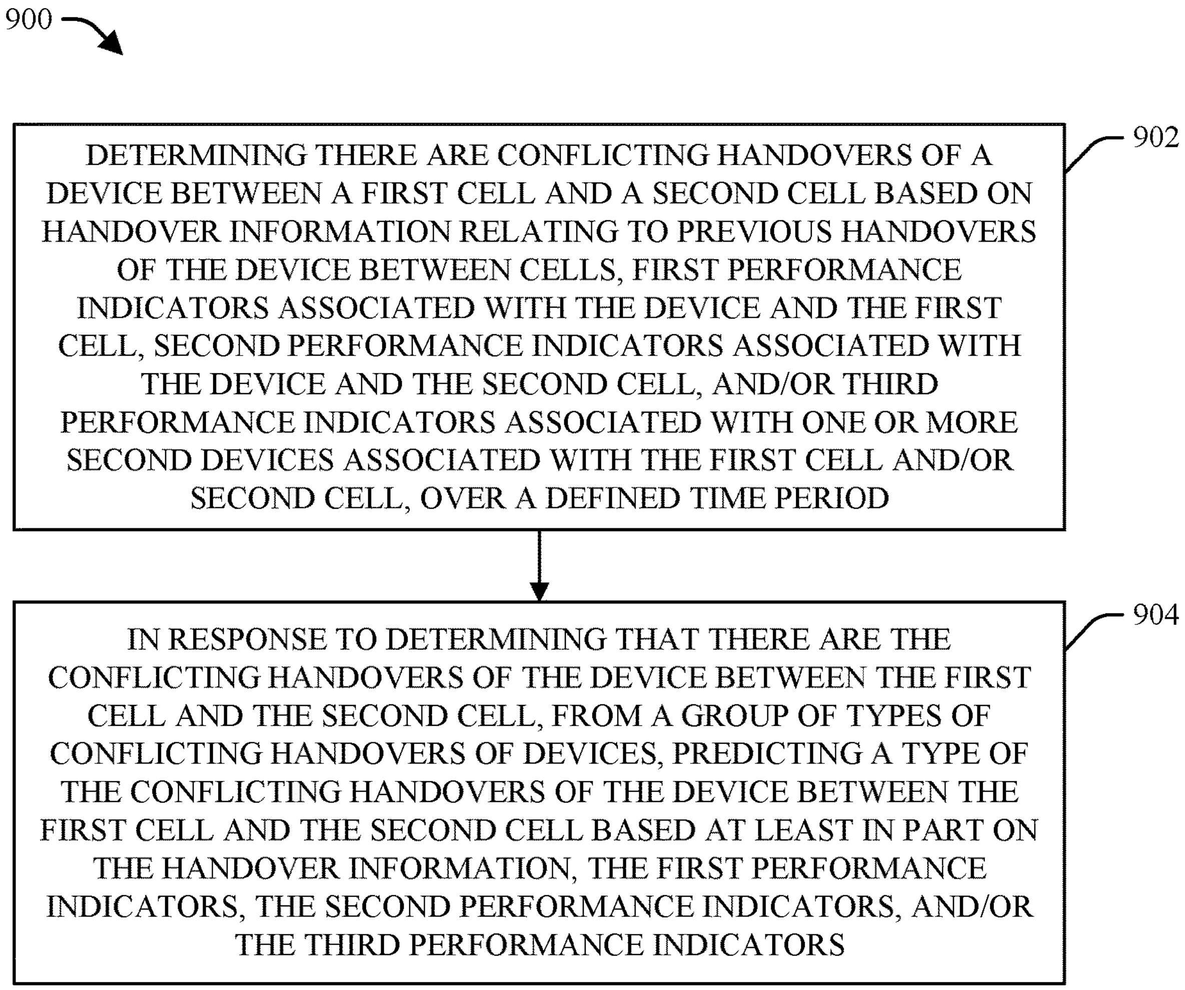

FIG. 9

ANALYZING THE HANDOVER INFORMATION RELATING TO PREVIOUS HANDOVERS OF THE DEVICE BETWEEN CELLS, THE FIRST PERFORMANCE INDICATORS ASSOCIATED WITH THE DEVICE AND THE FIRST CELL, THE SECOND PERFORMANCE INDICATORS ASSOCIATED WITH THE DEVICE AND THE SECOND CELL, AND/OR THE THIRD PERFORMANCE INDICATORS ASSOCIATED WITH ONE OR MORE SECOND DEVICES ASSOCIATED WITH THE FIRST CELL AND/ OR SECOND CELL, OVER THE DEFINED TIME PERIOD

1104

PREDICTING A TYPE OF THE CONFLICTING HANDOVERS OF THE DEVICE BETWEEN THE FIRST CELL AND THE SECOND CELL, BASED AT LEAST IN PART ON THE RESULTS OF THE ANALYSIS

1106

DETERMINING WHICH OF THE FIRST CELL OR THE SECOND CELL IS THE MORE DESIRABLE CELL TO WHICH THE DEVICE IS TO BE CONNECTED BASED AT LEAST IN PART ON A GROUP OF RULES RELATING TO MITIGATING CONFLICTING HANDOVERS AND THE RESULTS OF AN ANALYSIS OF THE TYPE OF CONFLICTING HANDOVERS OF THE DEVICE BETWEEN THE FIRST CELL AND THE SECOND CELL, THE FIRST PERFORMANCE INDICATORS, THE SECOND PERFORMANCE INDICATORS, AND/OR THE THIRD PERFORMANCE INDICATORS

1108

IN RESPONSE TO DETERMINING THAT THE DEVICE IS TO BE CONNECTED TO THE FIRST CELL BECAUSE THE FIRST CELL IS THE MORE DESIRABLE (E.G., BETTER OR BEST) CELL TO WHICH TO CONNECT THE DEVICE, COMMUNICATING INSTRUCTIONS TO THE FIRST CELL AND/OR THE SECOND CELL TO INSTRUCT OR INDICATE TO THE FIRST CELL AND/OR THE SECOND CELL THAT THE DEVICE IS TO BE CONNECTED TO THE FIRST CELL AND IS TO BE PREVENTED FROM HANDOVER FROM THE FIRST CELL TO THE SECOND CELL FOR AT LEAST A DEFINED AMOUNT OF TIME

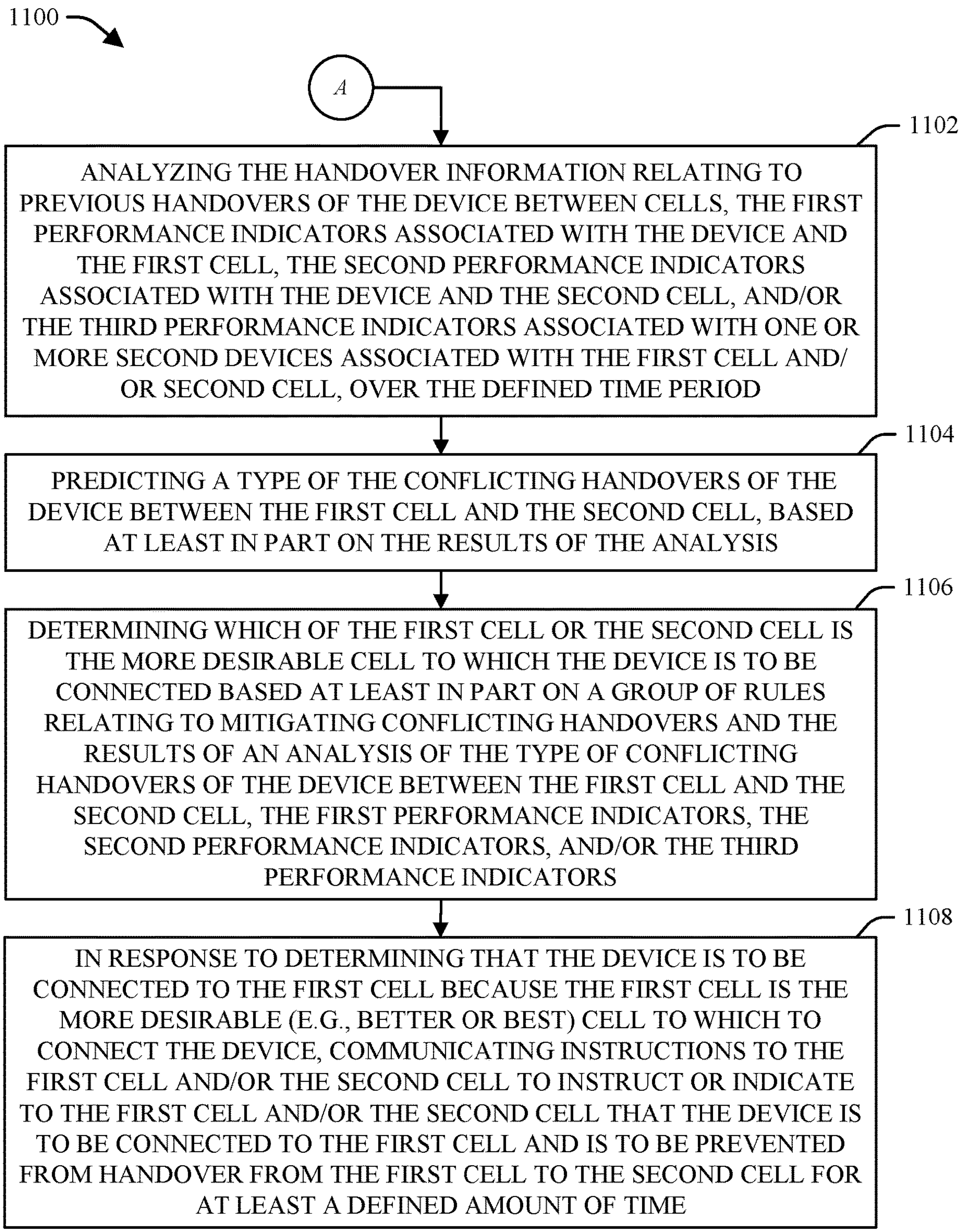

FIG. 11

MITIGATION OF MULTIPLE CONFLICTING HANDOVERS

BACKGROUND

Communication networks can enable users to use devices to wirelessly connect to a communication network and communicate with other devices (e.g., wireless devices or other communication devices). A device, such as a mobile device (e.g., smart phone or other mobile wireless device) can connect (e.g., wirelessly connect) to a cell (e.g., cell of a base station) or other access point to facilitate connection to a communication network. For instance, a mobile device can connect to a cell located near the mobile device. As the mobile device moves from one location to another location, the communication network can handover the mobile device from a first cell to a second cell (e.g., nearer to the other location, or otherwise better able to provide a wireless connection to the mobile device). In some instances, a mobile device may be located in proximity to the first cell and the second cell such that the mobile device undesirably can be experiencing multiple and conflicting handovers between the first cell and the second cell.

The above-described description is merely intended to provide a contextual overview regarding communication systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise determining, by a system comprising at least one processor, that there are conflicting handovers of a device between a first cell and a second cell based on handover information relating to previous handovers of the device, first performance indicators associated with the device and the first cell, and second performance indicators associated with the device and the second cell, over a defined time period. The method also can include: in response to determining that there are the conflicting handovers of the device between the first cell and the second cell, from a group of types of conflicting handovers of devices, predicting, by the system, a type of the conflicting handovers of the device between the first cell and the second cell based on the handover information, the first performance indicators, and the second performance indicators.

In certain embodiments, the disclosed subject matter can comprise a system that can comprise at least one memory that can store computer executable components, and at least one processor that can execute computer executable components stored in the at least one memory. The computer executable components can comprise a conflicting handovers detector that can detect conflicting user equipment handovers of a user equipment between first network equipment and second network equipment based on handover data relating to previous user equipment handovers of the user equipment, first performance indicators associated with the user equipment and the first network equipment, and second performance indicators associated with the user equipment and the second network equipment, over a defined time period. The computer executable components also can comprise a conflicting handovers identifier that, in response to detection of the conflicting user equipment handovers of the user equipment between the first network equipment and the second network equipment, can predict, from a group of types of conflicting user equipment handovers, a type of the conflicting user equipment handovers of the user equipment between the first network equipment and the second network equipment based on the handover data, the first performance indicators, and the second performance indicators.

In still other embodiments, the disclosed subject matter can comprise a non-transitory machine-readable medium, comprising executable instructions that, when executed by at least one processor, can facilitate performance of operations. The operations can comprise determining that there are conflicting handovers of a device between a first base station and a second base station based on handover information relating to previous handovers of the device, first performance indicators associated with the device and the first base station, and second performance indicators associated with the device and the second base station, over a defined time period. The operations also can comprise: in response to determining that there are the conflicting handovers of the device between the first base station and the second base station, from a group of types of conflicting handovers of devices, predicting a type of the conflicting handovers of the device between the first base station and the second base station based on the handover information, the first performance indicators, and the second performance indicators.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

BRIEF DESCRIPTION OF THE DRAWINGS

FIG. 9 illustrates a flow chart of an example method that can desirably manage, detect, predict a type of, and facilitate mitigating conflicting handovers of a device between cells of a communication network, in accordance with various aspects and embodiments of the disclosed subject matter.

FIG. 11 illustrates a flow chart of an example method that can desirably manage, predict or identify a type of, and mitigate conflicting handovers of a device between cells of a communication network, in accordance with various aspects and embodiments of the disclosed subject matter.

DETAILED DESCRIPTION

Figure 1:
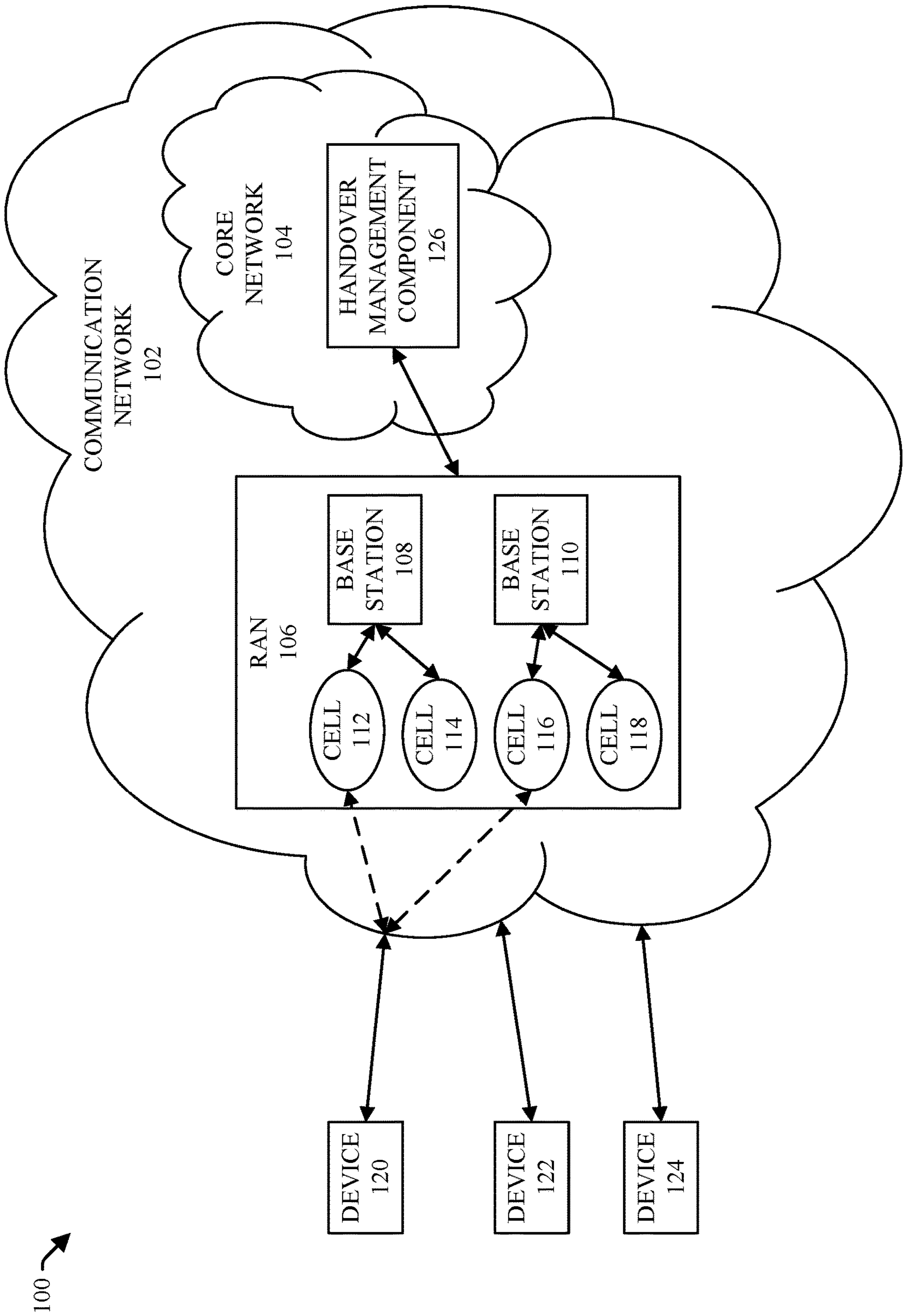
FIG. 1 illustrates a block diagram of a non-limiting example system that can desirably manage, detect, identify a type of, and mitigate conflicting handovers of a device between cells of a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to detecting, managing, and mitigating conflicting handovers of devices between cells of a communication network (e.g., communication network comprising a core network that can facilitate wireless communication of information between devices, including wireless devices). A device, such as a mobile device (e.g., user equipment (UE), smart phone, or other mobile wireless device) can connect (e.g., wirelessly connect) to a cell (e.g., cell of a base station) or other access point of the communication network to facilitate connection to the communication network. For instance, a mobile device can connect to a first cell located near the mobile device. As the mobile device moves from one location to another location, the first cell can handover the mobile device from the first cell to a second cell (e.g., nearer to the other location, or otherwise better able to provide a wireless connection to the mobile device). In some instances, a mobile device may be located in proximity to the first cell and the second cell such that the mobile device undesirably (e.g., unwantedly, inefficiently, unsuitably, unacceptably, or suboptimally) can be experiencing multiple and conflicting handovers between the first cell and the second cell.

A handover of a device (e.g., mobile or wireless device) between cells can be a desirable (e.g., wanted or suitable) and significant (e.g., major, important, critical, or otherwise significant) function that can allow the device to maintain a continuous connection (e.g., continuous wireless connection) to the communication network as the device moves from location to location. There can be various types of handovers of devices between cells, with each type of handover designed to address a specific scenario. However, these various types of handovers of devices between cells also can cause conflicts that can result in undesirable (e.g., unwanted, inefficient, unsuitable, unacceptable, or suboptimal) multiple and conflicting handovers of the device between two or more cells (e.g., ping pong handovers of the device between cells) without the device being able to camp on one particular cell (e.g., a single cell) for a reasonable or suitable amount of time. The various types of handovers of devices between cells that can lead to undesirable conflicting (e.g., ping pong conflicting) handovers of devices between cells can comprise or relate to downlink coverage associated with the device, uplink traffic steering associated with the device, uplink signal-to-interference-plus-noise ratio (SINR) associated with the device, quality of service (QoS) associated with the device, load balance of a cell associated with the device, and/or device capability handover. The undesirable conflicting (e.g., ping pong conflicting) handovers of devices between cells (e.g., repeated and frequent switching of devices between cells) undesirably (e.g., unwantedly, inefficiently, unsuitably, unacceptably, or suboptimally) can cause signal disruption for devices, dropped calls for devices, degraded data transmission for devices, poor user experience (e.g., poor or low QoS and/or poor or low quality of experience (QoE) for users), reduced network efficiency of the communication network, device battery drain (e.g., unnecessary or inefficient use of the battery or other power of the device), and/or other problems or inefficiencies.

Some existing techniques for mitigating conflicting handovers of devices between cells undesirably (e.g., inefficiently, unsuitably, or suboptimally) can rely on static approaches for detecting and mitigating the conflicting handovers. Such existing techniques can involve modifying mobility parameters, such as hysteresis, time-based handover, handover trigger filtering, or cell re-selection parameters, associated with devices or cells. However, these existing static techniques can have undesirable (e.g., inefficient, unsuitable, or suboptimal) limitations. For example, these existing static techniques typically may not consider dynamic changes in cell conditions of cells. Also, these existing static techniques typically may not take into account the actual desired (e.g., suitable or optimal) requests, specifications (e.g., requirements), or wants (e.g., needs) for each device.

The disclosed subject matter can address and overcome these and other deficiencies of these existing techniques with regard to detecting and mitigating undesirable conflicting handovers of devices between cells. In that regard, it can be desirable (e.g., wanted, advantageous, beneficial, or optimal) to be able to improve detection of undesirable conflicting handovers of devices between cells. It also can be desirable to be able to predict or identify a type of the conflicting handovers of a device between cells. It further can be desirable to be able to determine a desirable mitigation action to take to mitigate the conflicting handovers of a device between cells, determine which of the cells is the better cell to which the device is to be connected based at least in part on the type of the conflicting handover, and/or prevent undesirable conflicting handovers of devices between cells.

The disclosed subject matter can employ enhanced handover management techniques that can desirably (e.g., automatically, dynamically, efficiently, advantageously, beneficially, enhancedly, or optimally) detect, and to learn how to better detect, undesirable conflicting handovers of devices between cells, desirably (e.g., automatically, dynamically, efficiently, advantageously, beneficially, enhancedly, or optimally) predict or identify, and to learn how to better predict or identify, a type of the conflicting handovers of a device between cells, desirably determine a mitigation action to take to mitigate the conflicting handovers of a device between cells, determine which of the cells is the better cell to which the device is to be connected based at least in part on the type of the conflicting handover, and/or prevent undesirable conflicting handovers of devices between cells.

To that end, techniques that can desirably (e.g., automatically, dynamically, predictively, suitably, reliably, efficiently, enhancedly, and/or optimally) manage, detect, identify, and mitigate conflicting handovers of a device between cells are presented. A system can comprise a handover management component that can desirably manage and mitigate conflicting handovers of devices between cells, in accordance with defined handover management criteria. In some embodiments, the handover management component can be associated with a RAN(s) (e.g., part of a controller (e.g., RAN intelligent controller (RIC)) associated with the RAN), although, in other embodiments, it can be located or situated elsewhere in or associated with the communication network.

The handover management component can comprise a conflicting handovers (CH) detector component that can detect or determine an occurrence of conflicting handovers of a device between a first cell and a second cell based at least in part on results of an analysis of handover information relating to previous handovers of the device between the first cell and second cell, first performance indicators (e.g., key performance indicators (KPIs)) associated with the device and the first cell, second performance indicators associated with the device and the second cell, and/or third performance indicators associated with one or more second devices associated with the first cell or the second cell, over a defined time period. In some embodiments, the CH detector component can employ a trained machine learning model (e.g., trained machine learning CH detector model) that can detect, and/or determine a probability of, an occurrence of conflicting handovers of the device between the first cell and the second cell based at least in part on results of an analysis (e.g., a machine learning-based analysis) of the handover information, the first performance indicators, the second performance indicators, and/or the third performance indicators, wherein the trained machine learning model can be trained to learn to detect conflicting handovers of devices between cells.

The handover management component also can comprise a CH identifier component that can predict, identify, or determine a type of conflicting handovers of a device between cells (e.g., downlink and uplink related conflicting handovers of the device between the cells, QoS related conflicting handovers of the device between the cells, load balancing and QoS related conflicting handovers of the device between the cells, or other type of conflicting handovers of the device between the cells). For instance, if the CH detector component detects the occurrence of conflicting handovers of the device between the first cell and the second cell, the CH identifier component can analyze the handover information, the first performance indicators, the second performance indicators, the third performance indicators, and/or other desired information. Based at least in part on the results of such analysis, the CH identifier component can predict, identify, or determine a type of the conflicting handovers of the device between the first cell and the second cell. In certain embodiments, the CH identifier component can employ a trained machine learning model (e.g., trained machine learning CH identifier model) that can predict the type of the conflicting handovers of the device between the first cell and the second cell, and/or determine a probability that the conflicting handovers type is the actual conflicting handovers type with respect to the device (e.g., relative to other probabilities that other types of conflicting handovers are an actual conflicting handovers type with respect to the device), based at least in part on results of an analysis (e.g., a machine learning-based analysis) of the handover information, the first performance indicators, the second performance indicators, the third performance indicators, and/or the other information, wherein such trained machine learning model can be trained to learn to predict, identify, or determine a conflicting handovers type of conflicting handovers of a device between cells.

In some embodiments, the handover management component can comprise a CH mitigator component that can take one or more mitigation actions to mitigate conflicting handovers of the device between cells when such conflicting handovers are detected. For instance, in response to detecting the conflicting handovers of the device between the first cell and the second cell, and the type of the conflicting handovers, the CH mitigator component can determine which of the first cell or the second cell is the better (e.g., best) cell to which the device is to be connected, based at least in part on a group of rules (e.g., application of the group of rules) and the results of analyzing conflicting handovers type information relating to the type of the conflicting handovers, the first performance indicators, the second performance indicators, the third performance indicators, and/or other desired information. The conflicting handovers type information can comprise, for example, a conflicting handover type value received from the CH identifier component, wherein the conflicting handover type value can indicate the type of the conflicting handovers of the device. If, for example, based at least in part on the rules and the analysis results, the CH mitigator component determines that the first cell is the better cell, the CH mitigator component can instruct the first cell and/or second cell that the device is to be, or to remain, connected to the first cell, and there is not to be a handover of the device from the first cell to the second cell (e.g., at least due to that type of conflicting handover issue) for at least a defined amount of time, in accordance with the applicable rule(s) and the corresponding defined handover management criteria.

The handover management component and the techniques disclosed herein, by desirably detecting whether undesirable conflicting (e.g., ping pong conflicting) handovers of devices between cells are occurring, desirably predicting or determining respective types of conflicting handovers of devices between cells, and desirably mitigating such conflicting handovers of devices between cells can desirably (e.g., suitably, reliably, efficiently, enhancedly, or optimally) reduce or minimize signal disruption for devices, reduce or minimize dropped calls for devices, enhance (e.g., improve, increase, or optimize) data transmission for devices, enhance user experience (e.g., enhance QoS and/or QoE for users), enhance network efficiency of the communication network, reduce or minimize device battery drain (e.g., reduce unnecessary or inefficient use of the battery or other power of the device), and/or mitigate, reduce, minimize, eliminate, or prevent other problems or inefficiencies.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, predictively, suitably, reliably, efficiently, enhancedly, and/or optimally) manage, detect, identify a type of, and mitigate conflicting handovers of a device between cells of a communication network, in accordance with various aspects and embodiments of the disclosed subject matter. The system 100 can comprise a communication network 102 that can comprise a core network 104 and one or more radio access networks (RANs), such as RAN 106, that can be associated with (e.g., communicatively connected to) the core network 104. Each RAN (e.g., RAN 106) can comprise one or more base stations, such as, for example, base station 108 and base station 110, that each can comprise one or more cells, such as cell 112, cell 114, cell 116, and/or cell 118. In some embodiments, cells 112 and 114 can be part of the base station 108, and cells 116 and 118 can be part of the base station 110.

The core network 104, the one or more RANs (e.g., RAN 106), the one or more base stations (e.g., base stations 108 and 110), and the one or more cells (e.g., cells 112, 114, 116, and/or 118) can facilitate (e.g., enable) wireless communication of data (e.g., voice or other audio data, video data, textual data, or other data) between devices (e.g., communication devices or UEs), such as devices associated with the core network 104, via the one or more RANs, one or more base stations, and one or more cells, and other devices associated with the core network 104 or, more generally, the communication network 102 (e.g., a device, such as a server or computer, can be connected to the communication network 102 via a wireline connection or via a network other than the core network 104).

The devices can comprise, for example, devices 120, 122, and/or 124. A device (e.g., 120, 122, or 124) can be, for example, a wireless, mobile, or smart phone, a computer, a laptop computer, a server, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device (e.g., 120, 122, or 124) can be associated with (e.g., communicatively connected to) the communication network 102 via a communication connection and channel, which can include a wireless or wireline communication connection and channel.

In accordance with various embodiments, the core network 104 can comprise various network components that can facilitate wireless communication of data. In some embodiments, the RAN 106 can be a 5G or other NR RAN (e.g., gNB or other NR-type or xG RAN, wherein x can be a number greater than 5), and/or the base station(s) (e.g., base station 108 and/or base station 110) can be a 5G or other NR base station (e.g., gNB or other NR-type or xG base station, wherein x can be a number greater than 5). In certain embodiments, the core network 104 can comprise a UPF node, an access and mobility management function (AMF) node, and/or other network functions. The UPF node can connect to or interface with the one or more RANs (e.g., RAN 106) and the one or more base stations (e.g., base station 108 or base station 110), can be an interconnect point between the core network and a data network (DN), can provide or facilitate providing a protocol data unit (PDU) session anchor point for providing mobility associated with radio access technologies (RATs), can provide or facilitate providing data packet routing or forwarding, and/or can perform or manage other functions. The AMF node can be a control plane function that can manage registration and deregistration of devices (e.g., devices 120, 122, and/or 124) with the core network 104, manage connections of devices with the core network 104, manage mobility associated with devices (e.g., maintain knowledge of locations of devices, update locations of devices), and/or manage or perform other functions. In accordance with various other embodiments, the RAN(s) (e.g., RAN 106) and/or the base station(s) (e.g., base station 108 and/or base station 110) can be a $4^{th}$ generation (4G) long term evolution (LTE) RAN or base station, or the RAN or base station can comprise 4G LTE technology and functions, and 5G or other NR-type or xG technology and functions.

The communication network 102, more generally, or the core network 104 can comprise various other network equipment (e.g., routers, gateways, transceivers, switches, access points, network functions, processor components, data stores, or other devices or network nodes) that facilitate (e.g., enable) communication of information between respective items of network equipment of the communication network 102, and/or communication of information between the one or more devices (e.g., devices 120, 122, and/or 124) and the communication network 102. The communication network 102, including the core network 104, can provide or facilitate wireless or wireline communication connections and channels between the one or more devices (e.g., devices 120, 122, and/or 124), and/or respectively associated services or applications, and the communication network 102. For reasons of brevity or clarity, some of the various network equipment, components, functions, or devices of the communication network may not be explicitly shown or described herein.

At various times, the respective devices (e.g., devices 120, 122, and/or 124) can utilize respective services. The services can comprise or relate to, for example, voice service (e.g., conversational voice services or other voice services), video streaming service, conversational video service, buffered video service, audio streaming service, other type of streaming service, text or messaging service, data service, control message service (e.g., control message service relating to control of communication network functions and operations), signaling service, real time gaming service, interactive gaming service, transmission control protocol (TCP) service, control message service relating to automated or semi-automated vehicles or motorized devices, law enforcement-related service, medical-related service, emergency-related service, military-related service, background traffic service, or other desired types of service.

As a device (e.g., devices 120, 122, or 124), connected to a cell (e.g., cell 112 of the base station 108), is being used, the device may move from location to location such that the device may come in closer proximity to another cell (e.g., cell 116 of the base station 110), and/or conditions (e.g., communication conditions, environmental conditions, or other conditions) associated with the device, the cell (e.g., cell 112 of the base station 108) to which the device is connected, and/or the other cell (e.g., cell 116 of the base station 110) may change such that the device may have better communication conditions with the other than with the cell. As a result, there may be a handoff of the device from the cell to the other cell. In some instances, for one or more reasons, such as described herein, there may be multiple and conflicting handovers (e.g., conflicting ping pong handovers) of the device between the cell and the other cell over a relatively short period of time (e.g., downlink and uplink related conflicting handovers of the device between the cells, QoS related conflicting handovers of the device between the cells, load balancing and QoS related conflicting handovers of the device between the cells, or other type of conflicting handovers of the device between the cells).

The various types of handovers of devices between cells that can lead to undesirable conflicting handovers of devices between cells can comprise or relate to, for example, downlink coverage associated with the device, uplink traffic steering associated with the device, uplink SINR associated with the device, QoS associated with the device, load balance of a cell associated with the device, and/or device capability handover. For instance, there can be downlink and uplink related conflicting handovers of a device between cells that can occur when the device is engaging in uplink communications and downlink communications concurrently or at the same time (or near the same time). The device may be subjected to a handover from a first cell to a second cell due to a determination or prediction that the device will have better downlink performance on the second cell. When the device is handed off to the second cell, that second cell determines or predicts the device should be handed off to the first cell due to the second cell determining or predicting the device will have better uplink performance on the first cell. These conflicting handovers of the device between the first and second cells may occur repeatedly.

As another example, there can be QoS related conflicting handovers of a device between cells that can occur when the first cell predicts or determines that the device will have better QoS on the second cell, and the device is handed off to the second cell. The second cell predicts or determines that the device will have better QoS on the first cell, and the second cell hands off the device back to the first cell. These QoS related conflicting handovers of the device between the first and second cells may occur repeatedly. Such QoS related handovers of the device between the cells can occur for a variety of reasons, such as, for example, coverage associated with the device, capability (e.g., UE capability) of the device, performance of the device or the cells (e.g., as indicated by the performance indicators associated with the device and/or the cells), interference with communication being experienced by the device, a service type of a service being utilized by the device, or another reason.

As still another example, there can be load balancing and QoS related conflicting handovers of a device between cells that can occur when the first cell is initiating a load balancing process that results in the first cell handing off the device to the second cell. After the device is handed off to the second cell, the second cell predicts or determines that the device will have better QoS on the first cell, and the second cell hands off the device back to the first cell, where these conflicting handovers of the device between the first and second cells may occur repeatedly.

Conflicting (e.g., ping pong conflicting) handovers of devices between cells (e.g., repeated and frequent switching of devices between cells) undesirably (e.g., unwantedly, inefficiently, unsuitably, unacceptably, or suboptimally) can cause signal disruption for devices, dropped calls for devices, degraded data transmission for devices, poor user experience (e.g., poor or low QoS and/or poor or low QoE for users), reduced network efficiency of the communication network, device battery drain (e.g., unnecessary or inefficient use of the battery or other power of the device), and/or other problems or inefficiencies. As disclosed herein, existing techniques for handling conflicting handovers of a device between cells can be deficient in a number of ways.

Figure 2:
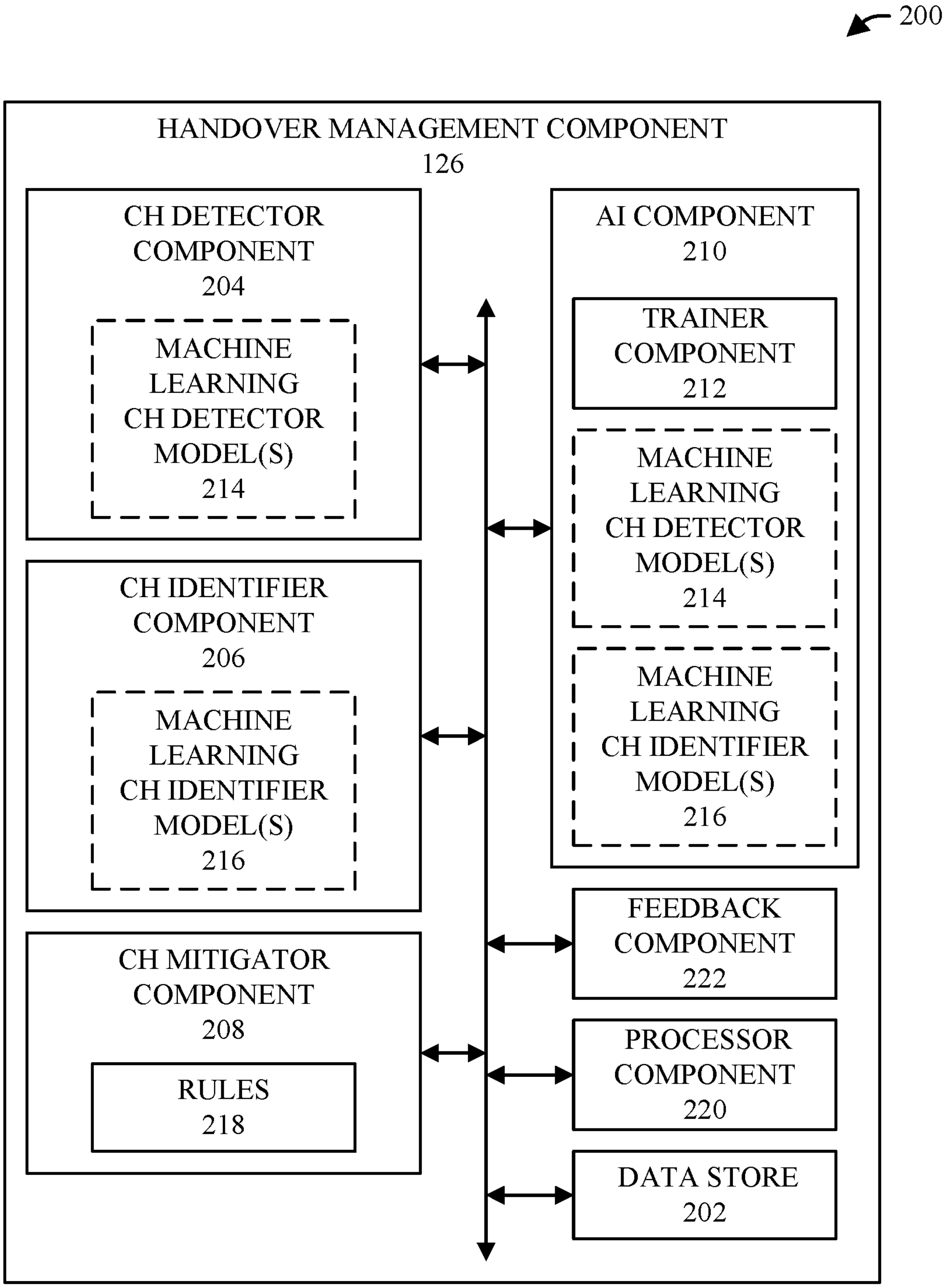
FIG. 2 depicts a block diagram of non-limiting example handover management component, in accordance with various aspects and embodiments of the disclosed subject matter.

To that end, the system 100 can comprise a handover management component 126 that can desirably (e.g., automatically, dynamically, predictively, suitably, reliably, efficiently, enhancedly, and/or optimally) manage, detect, identify a type of, and mitigate undesirable conflicting handovers of devices between cells, in accordance with the defined handover management criteria. Referring to FIG. 2 (along with FIG. 1), FIG. 2 depicts a block diagram of non-limiting example handover management component 126, in accordance with various aspects and embodiments of the disclosed subject matter. In accordance with various embodiments, the handover management component 126 can be part of the core network 104 and associated with (e.g., communicatively connected to) the RAN 106 (as depicted in FIG. 1), or can be part of the RAN 106. In certain embodiments, the handover management component 126 can be part of a controller (e.g., RIC) associated with the RAN 106, such as described herein. In other embodiments, the handover management component 126 can reside in another location (e.g., another physical or logical location) of or associated with the communication network 102, and can be associated with (e.g., communicatively connected to) the RAN 106.

The handover management component 126 can monitor, and can collect (e.g., receive, obtain, and/or aggregate) information relating to, performance (e.g., communication conditions or performance indicators) of or associated with the devices (e.g., devices 120, 122, and/or 124) and/or respective cells (e.g., cells 112, 114, 116, and/or 118) of respective base stations (e.g., base stations 108 and/or 110), and respective handovers of the respective devices between respective cells. The performance indicators (e.g., KPIs) can comprise or relate to, for example, uplink SINR, downlink SINR, a reference signal received power (RSRP), a reference signal received quality (RSRQ), an uplink data throughput, a downlink data throughput, a QoS, a bandwidth, a delay (e.g., data packet delay), a jitter, a data packet loss rate, a data packet retransmission rate, or other performance indicator associated with a device (e.g., devices 120, 122, or 124). The handover management component 126 can comprise or be associated with a data store 202, and can store the information in the data store 202. The handover management component 126 also can analyze this information to facilitate detecting whether there are conflicting handovers of a device (e.g., device 120) between cells (e.g., cells 112 and 116), predicting or determining a type of the conflicting handovers of the device between cells, and/or mitigating the conflicting handovers of the device.

In accordance with various embodiments, the handover management component 126 can comprise a conflicting handovers (CH) detector component 204 that can detect whether there are conflicting handovers of a device (e.g., device 120) between cells (e.g., cells 112 and 116), a CH identifier component 206 that can predict or determine a type of the conflicting handovers of the device between cells, and a CH mitigator component 208 that can desirably mitigate the conflicting handovers of the device, in accordance with the defined handover management criteria, such as described herein. In a non-limiting example scenario, the device (e.g., device 120) can be connected to the cell 112 (e.g., first cell) of the base station 108. In some embodiments, the CH detector component 204 can analyze handover information relating to previous handovers of the device 120 between cells (e.g., cells 112, 114, 116, and/or 118), first performance indicators associated with the device 120 and the first cell 112, second performance indicators associated with the device 120 and a second cell 116 of the base station 110 (and/or one or more other cells (e.g., cell 114 and/or cell 118) with which the device 120 has been associated), third performance indicators associated with one or more second devices (e.g., device 122 and/or device 124) associated with the first cell 112 and/or second cell 116 (and/or the one or more other cells with which the device 120 has been associated), and/or other desired (e.g., pertinent) information, over a defined time period.

Based at least in part on the results of the analysis of the handover information, the first performance indicators, the second performance indicators, the third performance indicators, and/or the other desired information, the CH detector component 204 can predict, determine, or detect whether there are conflicting handovers of the device 120 between the first cell 112 and the second cell 116 (and/or another cell(s), such as cell 114 and/or cell 118). For instance, based at least in part on the analysis results, the CH detector component 204 can predict, determine, or detect whether there are conflicting handovers of the device 120 between the first cell 112 and the second cell 116 (and/or another cell(s), such as cell 114 and/or cell 118) such that the device 120 undesirably is frequently, repeatedly, and/or quickly being handed off between the first cell 112 and the second cell 116 (and/or another cell(s), such as cell 114 and/or cell 118), over the defined time period.

In accordance with various embodiments, the handover management component 126 can comprise or be associated with an artificial intelligence (AI) component 210 that can employ AI, machine learning, and/or other AI-type techniques and algorithms to determine or detect whether there are conflicting handovers of devices (e.g., the device 120) between cells (e.g., the first cell 112 and the second cell 116). In some embodiments, the AI component 210 can comprise, generate, and/or train machine learning models that can be trained to determine or detect whether there are conflicting handovers of devices (e.g., the device 120) between cells (e.g., the first cell 112 and the second cell 116). For instance, the AI component 210 can employ a trainer component 212 that can train a (trained) machine learning CH detector model 214 to learn to detect or determine whether there are conflicting handovers of devices (e.g., the device 120) between cells (e.g., the first cell 112 and the second cell 116), based at least in part on application of training data relating to conflicting handovers detection and/or feedback information relating to conflicting handovers detection to the (trained) machine learning CH detector model 214, such as described herein. Such training of the trained machine learning CH detector model 214 can enable the trained machine learning CH detector model 214 to learn to identify respective (e.g., different types of) data patterns in data (e.g., the handover information, the first performance indicators, the second performance indicators, the third performance indicators, and/or the other desired information) being analyzed by the trained machine learning CH detector model 214 and distinguish between data patterns in the data (if any) that can indicate conflicting handovers of a device between cells are occurring and other data patterns in the data (if any) that do not indicate occurrence of conflicting handovers of the device between cells.

In certain embodiments, the trained machine learning CH detector model 214 can perform a machine learning-based analysis on the handover information, the first performance indicators, the second performance indicators, the third performance indicators, and/or the other desired information. Based at least in part on the results of the machine learning-based analysis on the handover information, the first performance indicators, the second performance indicators, the third performance indicators, and/or the other desired information, the trained machine learning CH detector model 214 can determine or detect whether there are conflicting handovers of the device 120 between the first cell 112 and the second cell 116 (and/or another cell(s), such as cell 114 and/or cell 118). For instance, based at least in part on the machine learning-based analysis results, the trained machine learning CH detector model 214 can determine whether there are one or more data patterns in the data (e.g., the handover information, various performance indicators, and/or other desired information) that can indicate conflicting handovers of the device 120 between the first cell 112 and the second cell 116 are occurring and/or can determine a probability (e.g., a probability value) that there are conflicting handovers of the device 120 between the first cell 112 and the second cell 116 (and/or another cell(s), such as cell 114 and/or cell 118). In some embodiments, the trained machine learning CH detector model 214 can determine the probability based at least in part on whether the trained machine learning CH detector model 214 determines that there are one or more data patterns in the data that can indicate conflicting handovers of the device 120 between the first cell 112 and the second cell 116 are occurring. The CH detector component 204 or the trained machine learning CH detector model 214 can determine whether there are conflicting handovers of the device 120 between the first cell 112 and the second cell 116 (and/or another cell(s), such as cell 114 and/or cell 118) based at least in part on the probability and a defined threshold probability (e.g., a defined threshold probability value) relating to conflicting handovers detection, and/or based at least in part on whether there are one or more data patterns in the data that can indicate conflicting handovers of the device 120 between the first cell 112 and the second cell 116 are occurring.

For instance, the CH detector component 204 or the trained machine learning CH detector model 214 can compare the probability to the defined threshold probability to determine whether the probability satisfies (e.g., meets or exceeds; is at or greater than) the defined threshold probability. If, based at least in part on the results of such comparison, the CH detector component 204 or the trained machine learning CH detector model 214 determines that the probability does not satisfy (e.g., is less than) the defined threshold probability relating to conflicting handovers detection, the CH detector component 204 or the trained machine learning CH detector model 214 can determine that conflicting handovers of the device 120 between the first cell 112 and the second cell 116 (and/or another cell(s), such as cell 114 and/or cell 118) is not detected. If, instead, based at least in part on the comparison results, the CH detector component 204 or the trained machine learning CH detector model 214 determines that the probability does satisfy the defined threshold probability, the CH detector component 204 or the trained machine learning CH detector model 214 can determine that conflicting handovers of the device 120 between the first cell 112 and the second cell 116 (and/or another cell(s), such as cell 114 and/or cell 118) are detected.

If the CH detector component 204 or the trained machine learning CH detector model 214 determines that conflicting handovers of the device 120 between the first cell 112 and the second cell 116 (and/or another cell(s), such as cell 114 and/or cell 118) are not detected, the CH detector component 204 and/or the trained machine learning CH detector model 214 can generate an output that can indicate that conflicting handovers of the device 120 between the first cell 112 and the second cell 116 (and/or another cell(s), such as cell 114 and/or cell 118) are not detected, and can continue to monitor the performance (e.g., communication conditions or performance indicators) of or associated with the device 120 and/or respective cells (e.g., cells 112, 114, 116, and/or 118), and respective handovers of the device 120 between the first cell 112 and the second cell 116 (and/or another cell(s), such as cell 114 and/or cell 118). If, instead, the CH detector component 204 or the trained machine learning CH detector model 214 determines that conflicting handovers of the device 120 between the first cell 112 and the second cell 116 (and/or another cell(s), such as cell 114 and/or cell 118) are detected, the CH detector component 204 and/or the trained machine learning CH detector model 214 can generate an output (e.g., output indicator, output value, or other output data) that can indicate that conflicting handovers of the device 120 between the first cell 112 and the second cell 116 (and/or another cell(s), such as cell 114 and/or cell 118) are detected.

If the CH detector component 204 determines or identifies that conflicting handovers of the device 120 between the first cell 112 and the second cell 116 (and/or another cell(s), such as cell 114 and/or cell 118) are detected, the CH identifier component 206 can predict or determine a type (e.g., a conflicting handovers type) of the conflicting handovers of the device 120 between the first cell 112 and the second cell 116 (and/or another cell(s), such as cell 114 and/or cell 118). In some embodiments, if such conflicting handovers are detected, the CH identifier component 206 or other component (e.g., processor component) of the handover management component 126 can receive the output data from the CH detector component 204 indicating that such conflicting handovers are detected. In response, the CH identifier component 206 can analyze the handover information, the first performance indicators, the second performance indicators, the third performance indicators, and/or the other desired information. For instance, the CH identifier component 206 can analyze the handover information, the first performance indicators, the second performance indicators, the third performance indicators, and/or the other desired information to determine whether there are indications in such data of the type of the conflicting handovers of the device 120 between the first cell 112 and the second cell 116 (and/or another cell(s), such as cell 114 and/or cell 118) and/or the cause of such conflicting handovers. Based at least in part on the results of the analysis of such data, the CH identifier component 206 can predict or determine the type (e.g., a conflicting handovers type) of the conflicting handovers of the device 120 between the first cell 112 and the second cell 116 (and/or another cell(s), such as cell 114 and/or cell 118).

In accordance with various embodiments, the handover management component 126, employing the AI component 210, can employ AI, machine learning, and/or other AI-type techniques and algorithms to determine or identify a type of conflicting handovers of devices (e.g., the device 120) between cells (e.g., the first cell 112 and the second cell 116). In certain embodiments, the AI component 210 can comprise, generate, and/or train machine learning models that can be trained to determine or identify the type of conflicting handovers of devices (e.g., the device 120) between cells (e.g., the first cell 112 and the second cell 116). For instance, the AI component 210 can employ the trainer component 212 to train a (trained) machine learning CH identifier model 216 to learn to determine or identify the type of conflicting handovers of devices (e.g., the device 120) between cells (e.g., the first cell 112 and the second cell 116), based at least in part on application of training data relating to conflicting handovers type identification and/or feedback information relating to conflicting handovers type identification to the (trained) machine learning CH identifier model 216, such as described herein. Such training of the trained machine learning CH identifier model 216 can enable the trained machine learning CH identifier model 216 to learn to identify respective (e.g., different types of) data patterns in data (e.g., the handover information, the first performance indicators, the second performance indicators, the third performance indicators, and/or the other desired information) being analyzed by the trained machine learning CH identifier model 216 and distinguish between respective data patterns in the data (if any) that can indicate respective types of conflicting handovers of a device between cells.

In certain embodiments, the trained machine learning CH identifier model 216 can perform a machine learning-based analysis on the handover information, the first performance indicators, the second performance indicators, the third performance indicators, and/or the other desired information. Based at least in part on the results of the machine learning-based analysis on the handover information, the first performance indicators, the second performance indicators, the third performance indicators, and/or the other desired information, the trained machine learning CH identifier model 216 can predict, identify, or determine the type of the conflicting handovers of the device 120 between cells (e.g., the first cell 112 and the second cell 116) the first cell 112 and the second cell 116 (and/or another cell(s), such as cell 114 and/or cell 118) and/or the cause of such conflicting handovers.

For instance, based at least in part on the machine learning-based analysis results, the trained machine learning CH identifier model 216 can determine whether there are one or more data patterns in the data (e.g., the handover information, various performance indicators, and/or other desired information) that can indicate the type of the conflicting handovers of the device 120 between the first cell 112 and the second cell 116 (and/or another cell(s), such as cell 114 and/or cell 118) and/or can determine (e.g., calculate) one or more respective probabilities (e.g., one or more respective probability values) that one or more respective types of conflicting handovers is the type of the conflicting handovers of the device 120 between the first cell 112 and the second cell 116 (and/or another cell(s), such as cell 114 and/or cell 118). For example, based at least in part on the machine learning-based analysis results, the trained machine learning CH identifier model 216 can determine a first probability that a first conflicting handovers type is the conflicting handovers type that the device 120 is experiencing, a second probability that a second conflicting handovers type is the conflicting handovers type that the device 120 is experiencing, a third probability that a third conflicting handovers type is the conflicting handovers type that the device 120 is experiencing, and/or another probability that another conflicting handovers type is the conflicting handovers type that the device 120 is experiencing. In some embodiments, the trained machine learning CH identifier model 216 can determine a probability of a particular conflicting handovers type being the type of the conflicting handovers that the device 120 is experiencing based at least in part on whether the trained machine learning CH identifier model 216 determines that there are one or more data patterns in the data that can indicate the device 120 is experiencing that particular conflicting handovers type (e.g., relative to determining or identifying any other data patterns in the data indicating that one or more other conflicting handover types may be the type of conflicting handovers that the device 120 is experiencing).

In certain embodiments, based at least in part on the machine learning-based analysis results, the CH identifier component 206 or the trained machine learning CH identifier model 216 can predict or determine the conflicting handovers type that the device 120 is experiencing (e.g., the type of the conflicting handovers of the device 120 between the first cell 112 and the second cell 116 (and/or another cell(s), such as cell 114 and/or cell 118)) based at least in part on the respective probabilities that the respective conflicting handovers types are the conflicting handovers type that the device 120 is experiencing and/or a defined threshold probability (e.g., a defined threshold probability value) relating to conflicting handovers type, and/or based at least in part on the respective data patterns identified in the data by the trained machine learning CH identifier model 216 indicating the respective probabilities (e.g., respective likelihoods) that the respective conflicting handovers types are the type of conflicting handovers that the device 120 is experiencing. For example, the CH identifier component 206 or the trained machine learning CH identifier model 216 can determine which of the conflicting handovers types has a highest probability of being the conflicting handovers type that the device 120 is experiencing based at least in part on the results of comparing the respective probabilities of the respective conflicting handovers types to each other. In some embodiments, the CH identifier component 206 or the trained machine learning CH identifier model 216 also can determine whether the highest probability associated with a particular conflicting handovers type satisfies (e.g., meets or exceeds; is at or greater than) the defined threshold probability relating to conflicting handovers type, based at least in part on the result of comparing the highest probability to the defined threshold probability relating to conflicting handovers type.

If the CH identifier component 206 or the trained machine learning CH identifier model 216 determines that the highest probability associated with the particular conflicting handovers type satisfies the defined threshold probability relating to conflicting handovers type, the CH identifier component 206 or the trained machine learning CH identifier model 216 can predict or determine that the particular conflicting handovers type is the type of conflicting handovers that the device 120 is experiencing with respect to the first cell 112 and the second cell 116 (and/or another cell(s), such as cell 114 and/or cell 118)). In some embodiments, if, instead, the CH identifier component 206 or the trained machine learning CH identifier model 216 determines that the highest probability associated with the particular conflicting handovers type does not satisfy (e.g., does not meet; or is less than) the defined threshold probability relating to conflicting handovers type, the CH identifier component 206 or the trained machine learning CH identifier model 216 can indicate that the type of conflicting handovers that the device 120 is experiencing is not able to be predicted or determined, at least to a desired level of confidence. It is to be appreciated and understood that, in other embodiments, the CH identifier component 206 or the trained machine learning CH identifier model 216 can predict or determine that the particular conflicting handovers type is the type of conflicting handovers that the device 120 is experiencing with respect to the first cell 112 and the second cell 116 (and/or another cell(s), such as cell 114 and/or cell 118)), based at least in part on the particular conflicting handovers type being determined to have the highest probability relative to the other conflicting handovers types, without regard to the defined threshold probability relating to conflicting handovers type (e.g., without comparing the highest probability associated with the particular conflicting handovers type to the defined threshold probability, or even if the highest probability does not satisfy the defined threshold probability).

In some embodiments, if the CH identifier component 206 or the trained machine learning CH identifier model 216 predicts or determines the type of conflicting handovers that the device 120 is experiencing, the CH identifier component 206 can generate output data (e.g., an output data value, output indicator, or other type of output data) that can indicate or specify the type of the conflicting handovers that the device 120 is experiencing with respect to the first cell 112 and the second cell 116 (and/or another cell(s), such as cell 114 and/or cell 118)). For example, the CH identifier component 206 can generate, as output data, a first conflicting handovers type value that can indicate or specify that the device 120 is experiencing a first conflicting handovers type (e.g., downlink and uplink related conflicting handovers) if the CH identifier component 206 or the trained machine learning CH identifier model 216 predicts or determines that the device 120 is experiencing the first conflicting handovers type, a second conflicting handovers type value that can indicate or specify that the device 120 is experiencing a second conflicting handovers type (e.g., QoS related conflicting handovers) if the CH identifier component 206 or the trained machine learning CH identifier model 216 predicts or determines that the device 120 is experiencing the second conflicting handovers type, a third conflicting handovers type value that can indicate or specify that the device 120 is experiencing a third conflicting handovers type (e.g., load balancing and QoS related conflicting handovers) if the CH identifier component 206 or the trained machine learning CH identifier model 216 predicts or determines that the device 120 is experiencing the third conflicting handovers type, or another conflicting handovers type value that can indicate or specify that the device 120 is experiencing another conflicting handovers type if the CH identifier component 206 or the trained machine learning CH identifier model 216 predicts or determines that the device 120 is experiencing another conflicting handovers type.

The CH mitigator component 208 can desirably mitigate (e.g., prevent, stop, reduce, or minimize) the conflicting handovers that the device 120 is experiencing with respect to the first cell 112 and the second cell 116 (and/or another cell(s), such as cell 114 and/or cell 118)), based at least in part on a group of rules 218 relating to conflicting handovers mitigation, the type of the conflicting handovers that the device 120 is experiencing (e.g., the conflicting handovers type value received by the CH mitigator component 208), and/or the first performance indicators, the second performance indicators, the third performance indicators, and/or the other desired information, in accordance with the defined handover management criteria. In certain embodiments, the CH mitigator component 208 can analyze information relating to (e.g., indicating) the type of the conflicting handovers that the device 120 is experiencing (e.g., the conflicting handovers type value), the first performance indicators, the second performance indicators, the third performance indicators, and/or the other desired information, and can apply the group of rules 218 (e.g., apply the group of rules to such data or results obtained from the analysis of such data) as part of the analysis. Based at least in part on the results of such analysis and/or the application of the group of rules, the CH mitigator component 208 can determine a desirable (e.g., suitable, enhanced, or optimal) mitigation action that can be taken by the handover management component 126 and associated components (e.g., base station 108, base station 110, or other component) to desirably mitigate the conflicting handovers that the device 120 is experiencing with respect to the first cell 112 and the second cell 116 (and/or another cell(s), such as cell 114 and/or cell 118)).

For instance, based at least in part on the results of such analysis and/or the application of the group of rules 218, the CH mitigator component 208 can determine which cell of the first cell 112 and the second cell 116 (and/or another cell(s), such as cell 114 and/or cell 118), if they are part of the conflicting handovers of the device 120) is the better (e.g., best) cell to which the device 120 is to be connected (e.g., the cell that can be the best to provide the best overall performance for the device 120, the base station(s) (e.g., base stations 108 and/or 110), and/or the communication network 102) relative to (e.g., as compared to) the other cell(s), in accordance with the defined handover management criteria. The CH mitigator component 208 can implement or facilitate implementing a mitigation action to select or facilitate selecting the cell (e.g., first cell 112) that is determined to be the better cell to which the device 120 is to be connected, and also prevent (e.g., ban) or facilitate preventing handing off or steering the device 120 from that better cell to the other cell(s) (e.g., second cell 116 (and/or another cell(s) if part of the conflicting handovers of the device 120) for at least a defined amount of time, at least for the same reason that the conflicting handovers that the device 120 was experiencing were occurring.

If, for example, based at least in part on the group of rules 218 and the analysis results, the CH mitigator component 208 determines that the first cell 112 is the better cell, the handover management component 126 (e.g., the CH mitigator component 208 or other component of the handover management component 126) can generate instructions that can indicate or specify that the device 120 is to be connected to (e.g., camped on) the first cell 112, and/or also can indicate or specify that the device 120 is not to be handed off or steered from the first cell 112 to the second cell 116 (and/or another cell(s) if part of the conflicting handovers of the device 120) for at least the defined amount of time, at least for the same reason that the conflicting handovers that the device 120 was experiencing were occurring. The handover management component 126 can communicate these instructions to the first cell 112 (e.g., to the base station 108 comprising the cell 112) and/or the second cell 116 (e.g., to the base station 110 comprising the cell 116) (and/or to another cell(s) if part of the conflicting handovers of the device 120). The respective cells (e.g., cells 112, 114, 116, and/or 118) or associated base stations (e.g., base stations 108 and/or 110) can implement or execute the respective instructions to facilitate implementing the desired mitigation action(s), including connecting, or maintaining connection of, the device 120 to the first cell 112, and preventing (e.g., banning or restricting) handing off or steering the device 120 from the first cell 112 to the second cell 116 (and/or another cell(s) if part of the conflicting handovers of the device 120) for at least the defined amount of time, at least for the same reason that the conflicting handovers that the device 120 was experiencing were occurring.

The group of rules can comprise one or more rules that can facilitate determining and selecting the better (e.g., best) cell, of two or more cells, to which to connect a device that is experiencing conflicting handovers between two or more cells. The group of rules can correspond to or be in accordance with the defined handover management criteria. The one or more rules can relate to or indicate respective rankings of respective performance indicators associated with the device, the cells, and/or other devices in connection with respective types of conflicting handovers of devices between cells. For example, the one or more rules can relate to or indicate a first ranking of the respective performance indicators that can be applied with regard to the occurrence of a first type of conflicting handovers of devices between cells (e.g., downlink and uplink related conflicting handovers), a second ranking of the respective performance indicators that can be applied with regard to the occurrence of a second type of conflicting handovers of devices between cells (e.g., QoS related conflicting handovers), a third ranking of the respective performance indicators that can be applied with regard to the occurrence of a third type of conflicting handovers of devices between cells (e.g., load balancing and QoS related conflicting handovers), and/or another ranking of the respective performance indicators that can be applied with regard to the occurrence of another type of conflicting handovers of devices between cells. For instance, with regard to the first type of conflicting handovers, a first performance indicator associated with the device may be ranked higher in significance (e.g., importance), and/or weighted more heavily (e.g., given a higher weight value), than a second performance indicator associated with the device, whereas, with regard to the second type of conflicting handovers, the second performance indicator associated with the device may be ranked higher in significance, and/or weighted more heavily, than the first performance indicator associated with the device. The CH mitigator component 208 can apply the respective rankings and respective weightings (e.g., weight values) to the respective performance indicators, in accordance with the group of rules, and can apply one or more appropriate (e.g., applicable) rules of the group of rules, depending in part on the particular type of conflicting handovers the device is experiencing, to determine the better cell, of the two or more cells, to which to connect the device and resolve (e.g., mitigate, eliminate, or inhibit) the conflicting handovers of the device between the cells.

In certain embodiments, even if the defined amount of time has not expired, if there is another reason (e.g., another reason that is different from the cause of the conflicting handovers) for the device 120 to be handed off or steered from the first cell 112 to the second cell 116 (or another cell(s) (if any) that was part of the conflicting handovers of the device 120), or if there is a change in the status of the device 120 or cells that makes handing off or steering the device 120 from the first cell 112 to the second cell 116 (or another cell(s) (if any) that was part of the conflicting handovers of the device 120) desirable, the handover management component 126 can allow the device 120 to be handed off or steered from the first cell 112 to the second cell 116 (or the other cell(s)). The change in the status can comprise or relate to, for example, a change (e.g., a significant change) in the performance indicators associated with the device 120 or the cells, a change in the service being used, or a discontinuing of use of the service, by the device 120, a change in location of the device, a change in the type of communication (e.g., uplink communication or downlink communication) of data associated with the device 120, a change in the type or amount of data (e.g., video data, audio data, or textual data; and/or streaming video or streaming audio) being communicated with respect to the device 120, or other type of change (e.g., significant or substantial change) in status.

In accordance with various embodiments, the handover management component 126 can comprise or be associated with a processor component 220. The processor component 220 can be associated with (e.g., communicatively connected to) and can work in conjunction with the other components (e.g., the data store 202, CH detector component 204, CH identifier component 206, CH mitigator component 208, AI component 210, and/or other component) to facilitate performing the various functions and operations of the handover management component 126. The processor component 220 can employ one or more processors (e.g., one or more central processing units (CPUs)), microprocessors, or controllers that can process information relating to data, files, services, applications, communication networks, handovers of devices between cells, conflicting handovers of devices between cells, conflicting handovers detection, conflicting handovers identification, conflicting handovers mitigation, types of conflicting handovers of devices between cells, QoS levels or priority levels, load balancing, performance indicators (e.g., KPIs or other performance indicators), threshold performance indicator values, the group of rules, machine learning models, predictions and/or probabilities relating to conflicting handovers of devices between cells, training data, feedback information, data processing operations, messages, notifications, alarms, alerts, preferences (e.g., user or client preferences), hash values, metadata, parameters, traffic flows, policies, defined handover management criteria, algorithms (e.g., enhanced handover management algorithms, hash algorithms, data compression algorithms, data decompression algorithms, and/or other algorithm), interfaces, protocols, tools, and/or other information, to facilitate operation of the handover management component 126, and control data flow between the handover management component 126 and/or other components (e.g., network components, the core network 104, base stations 108 and/or 110, the communication network 102, a device (e.g., 120, 122, and/or 124), a node, a service, a user, or other entity) associated with the handover management component 126.

With further regard to the data store 202, the data store 202 can store data structures (e.g., user data, metadata), code structure(s) (e.g., modules, objects, hashes, classes, procedures) or instructions, information relating to data, files, services, applications, communication networks, handovers of devices between cells, conflicting handovers of devices between cells, conflicting handovers detection, conflicting handovers identification, conflicting handovers mitigation, types of conflicting handovers of devices between cells, QoS levels or priority levels, load balancing, performance indicators, threshold performance indicator values, the group of rules, machine learning models, predictions and/or probabilities relating to conflicting handovers of devices between cells, training data, feedback information, data processing operations, messages, notifications, alarms, alerts, preferences (e.g., user or client preferences), hash values, metadata, parameters, traffic flows, policies, defined handover management criteria, algorithms (e.g., enhanced handover management algorithms, hash algorithms, data compression algorithms, data decompression algorithms, and/or other algorithm), interfaces, protocols, tools, and/or other information, to facilitate controlling or performing operations associated with the handover management component 126. The data store 202 can comprise volatile and/or non-volatile memory, such as described herein. In an aspect, the processor component 220 can be functionally coupled (e.g., through a memory bus) to the data store 202 in order to store and retrieve information desired to operate and/or confer functionality, at least in part, to the data store 202, CH detector component 204, CH identifier component 206, CH mitigator component 208, AI component 210, processor component 220, and/or other component of the handover management component 126, and/or substantially any other operational aspects of the handover management component 126.

As disclosed, the data store 202 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

With further regard to the AI component 210, the AI component 210 can perform an AI and/or machine learning-based analysis on data, such as information relating to files, services, applications, communication networks, handovers of devices between cells, conflicting handovers of devices between cells, conflicting handovers detection, conflicting handovers identification, conflicting handovers mitigation, types of conflicting handovers of devices between cells, QoS levels or priority levels, load balancing, performance indicators, threshold performance indicator values, training data, feedback information, messages, notifications, alarms, alerts, preferences (e.g., user or client preferences), hash values, metadata, parameters, traffic flows, policies, defined handover management criteria, protocols, tools, and/or other information, such as more fully described herein. In connection with or as part of such an AI or machine learning-based analysis, the AI component 210 can employ, build (e.g., construct or create), and/or import, AI and/or machine learning techniques and algorithms, AI and/or machine learning models (e.g., trained models), neural networks (e.g., trained neural networks), Markov chains (e.g., trained Markov chains), and/or graph mining to render and/or generate predictions, inferences, calculations, prognostications, estimates, derivations, forecasts, detections, and/or computations that can facilitate determining or learning data patterns in data, determining or learning a correlation, relationship, or causation between an item(s) of data and another item(s) of data (e.g., occurrence of the other item(s) of data or an event relating thereto), determining or learning a correlation, relationship, or causation between an event and another event (e.g., occurrence of another event), determining or learning about relationships between components (e.g., base stations, cells, network nodes, communication links, devices, or other components or functions) of or associated with the communication network 102, determining or learning about conflicting handovers of devices between cells, determining or learning about the types of conflicting handovers of devices between cells, determining or learning about the respective relationships between respective performance indicators and the respective types of conflicting handovers of devices between cells, determining or learning other characteristics and features relating to conflicting handovers of devices between cells, and/or automating one or more functions or features of the disclosed subject matter, as more fully described herein.

Based at least in part on the results of the analysis, the AI component 210 can determine, train, and generate one or more models (e.g., machine learning CH detector model, machine learning CH identifier model, or other model) that can relate to conflicting handovers of devices between cells in a communication network as well as normal operation of the communication network (e.g., normal or non-conflicting handovers of devices between cells), wherein the models can model or be representative of historical performance of the communication network in connection with conflicting handovers of devices between cells in the communication network as well as normal operation of the communication network, and/or other features relating to the communication networks, such as described herein. The AI component 210 can update (e.g., modify, adjust, refine, or change), and further train and enhance, the model as additional data (e.g., information relating to further operation of the communication network, information relating to handovers or conflicting handovers of devices between cells, respective outcomes of respective mitigation actions performed or implemented by the CH mitigator component 208 and associated components of the communication network, conflicting handovers detection results output from the machine learning CH detector model, conflicting handovers predictions results output from the machine learning CH identifier model, respective performance indicators associated with the devices and/or cells, the feedback information, and/or other information) is received and analyzed by the AI component 210. In some embodiments, as part of the data analysis, and the determining and training of the models, the AI component 210 can employ (and/or train) Markov chains, a neural network(s), or other AI-based or machine learning-based modeling, techniques, functions, or algorithms.

The AI component 210 can employ various AI-based or machine learning-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 210 can examine the entirety or a subset of the data (e.g., the set of training data, the information relating to communication networks, handovers (e.g., normal or non-conflicting handovers) of devices between cells, and/or conflicting handovers of devices between cells, the performance indicators associated with devices and/or cells, the feedback information, and/or other information) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 3:
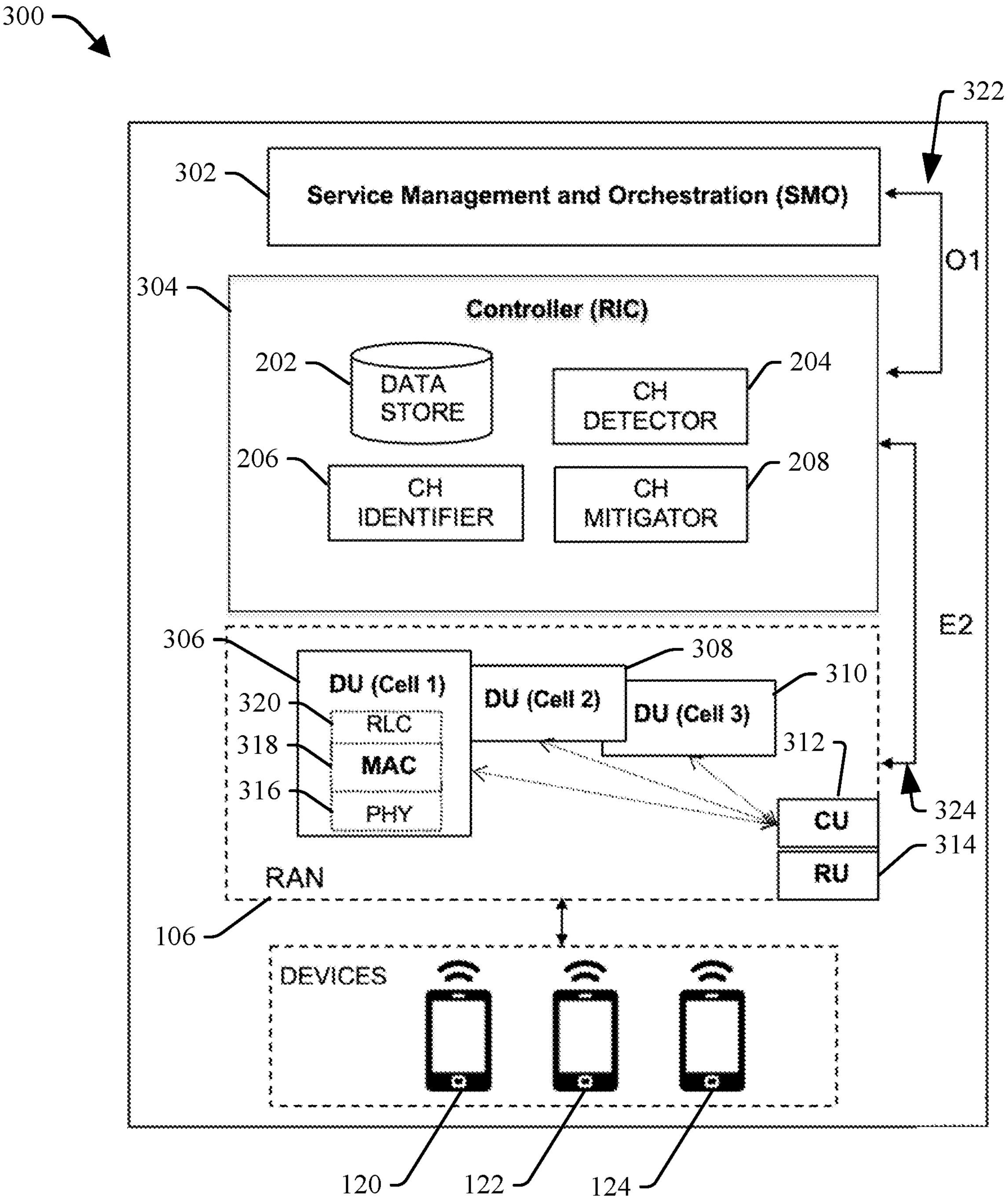
FIG. 3 illustrates a diagram of a non-limiting example system comprising an open radio access network (O-RAN) architecture that comprises the handover management component, in accordance with various aspects and embodiments of the disclosed subject matter.

Referring to FIG. 3 (along with FIGS. 1 and 2), FIG. 3 illustrates a diagram of a non-limiting example system 300 comprising an open RAN (O-RAN) architecture that comprises the handover management component 126, in accordance with various aspects and embodiments of the disclosed subject matter. In some embodiments, the non-limiting example system 300 can be part of the system 100 of FIG. 1. The system 300 can comprise the RAN 106, which can be a 5G or other NR (e.g., other xG) RAN, such as depicted in FIG. 3. In certain embodiments, the core network 104 can employ the O-RAN architecture, and can comprise a service management and orchestration (SMO) component 302 (e.g., an SMO platform), a controller component 304 (e.g., a RIC), and the RAN 106, when the RAN 106 is an O-RAN, such as depicted in FIG. 3.

The RAN 106 can comprise various RAN nodes, including distributed units (DUs) associated with cells (e.g., DU 306 of cell 1 (e.g., cell 112), DU 308 of cell 2 (e.g., cell 114), DU 310 of cell 3 (e.g., cell 116), and/or another DU of another cell (not shown in FIG. 3)), a central unit (CU) 312 associated with (e.g., communicatively connected to) the respective DUs, and/or a radio unit (RU) 314 associated with the CU, and/or other components. In some embodiments, a base station(s) (e.g., base stations 108 and/or 110) of the RAN 106, which also can be referred to as a gNodeB (gNB), can be logically divided into several components, which can allow for flexibility of deployment. For instance, the base station (e.g., base station 108 or 110) can comprise a DU(s) (e.g., 306, 308, or 310), which also can be referred to as gNB-DU. The DU (e.g., DU 306) can be a logical node that can host or handle baseband (e.g., physical (PHY) 316) and layer 2 (L2) (e.g., medium access control (MAC) layer 318 and radio link control (RLC) layer 320) functionality associated with the base station. The DUs 308 and/or 310 also can comprise respective PHY, MAC, and RLC layers. The base station (e.g., base station 108 or 110) also can comprise the CU 312, which can include a CU-control plane (CP) that also can be referred to as gNB-CU-CP. The CU-CP (also referred to as a CU-CP node) can be a logical node that can host or handle layer 3 (L3) (e.g., radio resource control (RRC) and packet data convergence protocol (PDCP) layer) control plane functionality associated with the base station. The CU 312 also can comprise a CU-UP, which also can be referred to as gNB-CU-UP. The CU-UP (also referred to as a CU-UP node) can be a logical node that can host or handle data traffic between the core network 104 (e.g., 5G core network) and the DUs (e.g., 306, 308, and/or 310) to which the CU-UP is connected. The RU 314 (e.g., O-RAN RU) can be or can comprise a logical node that can host a lower PHY layer and radio frequency (RF) processing, where signals (e.g., RF signals) can be transmitted, received, amplified, digitized, or otherwise processed, to facilitate communication of information (e.g., signals comprising information) between the RAN 106 and other devices (e.g., devices 120, 122, or 124) or components (e.g., components or functions of the core network 104 or communication network 102).

In some embodiments, the SMO component 302 can communicate with the controller component 304 (e.g., transmit information to or receive information from the controller component 304) via an interface, such as an O1 interface 322. The controller component 304 can communicate with the RAN 106 (e.g., transmit information to or receive information from RAN or E2 nodes of the RAN 106) via an interface, such as an E2 interface 324.

At various times, one or more devices (e.g., UEs), such as device 120, device 122, and/or device 124 can be connected (e.g., wirelessly connected) to the RAN 106 via the respective cells (e.g., cells 112, 114, 116, or 118) of the RAN 106. For instance, one or more respective devices (e.g., devices 120, 122, and/or 124) can be associated with (e.g., communicatively connected to) one or more respective DUs (e.g., DUs 306, 308, or 310) associated with one or more respective cells (e.g., cells 112, 114, 116, or 118) to facilitate communicating data traffic to the core network 104 and/or another communication device associated with the core network 104 or other associated communication network.

The SMO component 302 can act and operate as a management and orchestration layer that can control configuration and automation aspects of the controller component 304 and RAN elements of the RAN 106. The SMO component 302 can comprise various types of management services and various network functions, comprising network management functions, which can include RAN-type or RAN-related functions, core management functions, transport management functions, network slice management functions (e.g., end-to-end network slice management functions), and/or other network management functions. In accordance with various embodiments, the network functions can be or can comprise physical network functions, virtualized network functions (e.g., virtual machines (VMs), containers, or other virtualized network functions). At least some of the various network functions (e.g., network management functions or other network functions) can operate in real time or near real time.

The controller component 304 (e.g., RIC) can operate to control (e.g., manage) and enhance (e.g., improve or optimize) RAN functions and services of the RAN 106. At least some of the various network functions and components of the controller component 304 can operate in real time or near real time, and some network functions and components of the controller component 304 may operate in non-real time. In certain embodiments, the controller component 304 can comprise the handover management component 126, including the data store 202 (e.g., data store comprising one or more databases and data), the CH detector component 204, the CH identifier component 206, the CH mitigator component 208, and/or other components of the handover management component 126, which can operate and comprise respective functionalities and features, such as described herein. For instance, the data store 202 can store and provide various types of information, including handover information, performance indicators associated with devices and/or cells, and/or other desired information. The CH detector component 204 can detect occurrences of conflicting handovers of devices between cells, and can distinguish between conflicting handovers of devices between cells and non-conflicting handovers of devices between cells. In some embodiments, the CH detector component 204 can employ the trained machine learning CH detector model(s) 214 that can be trained to learn to detect (e.g., accurately, reliably, efficiently, enhancedly, or optimally detect) occurrences of conflicting handovers of devices between cells, and distinguish between conflicting handovers of devices between cells and non-conflicting handovers of devices between cells, such as described herein.

When conflicting handovers associated with a device (e.g., device 120) have been detected, the CH identifier component 206 can predict, determine, or identify a conflicting handovers type of the conflicting handovers of the device between cells (e.g., cell 112 and cell 116). In some embodiments, the CH detector component 204 can employ the trained machine learning CH identifier model(s) 216 that can be trained to learn to predict, determine, or identify (e.g., accurately, reliably, efficiently, enhancedly, or optimally predict, determine, or identify) a conflicting handovers type of conflicting handovers of a device between cells, and distinguish between different types of conflicting handovers of devices between cells, such as described herein. The CH mitigator component 208 can desirably mitigate conflicting handovers of devices between cells, based at least in part on the conflicting handovers type and application of one or more rules of the group of rules 218, such as described herein.

In accordance with various embodiments, one or more of the respective components of the handover management component 126 can be or can comprise one or more respective applications (e.g., applications (Apps), such as xApps or other type of Apps) that can perform one or more of the respective functions of the one or more of the respective components of the handover management component 126. For instance, the CH detector component 204 can comprise or employ a CH detector xApp that can perform one or more of the functions of the CH detector component 204, the CH identifier component 206 can comprise or employ a CH identifier xApp that can perform one or more of the functions of the CH identifier component 206, and/or the CH mitigator component 208 can comprise or employ a CH mitigator xApp that can perform one or more of the functions of the CH mitigator component 208.

Figure 4:
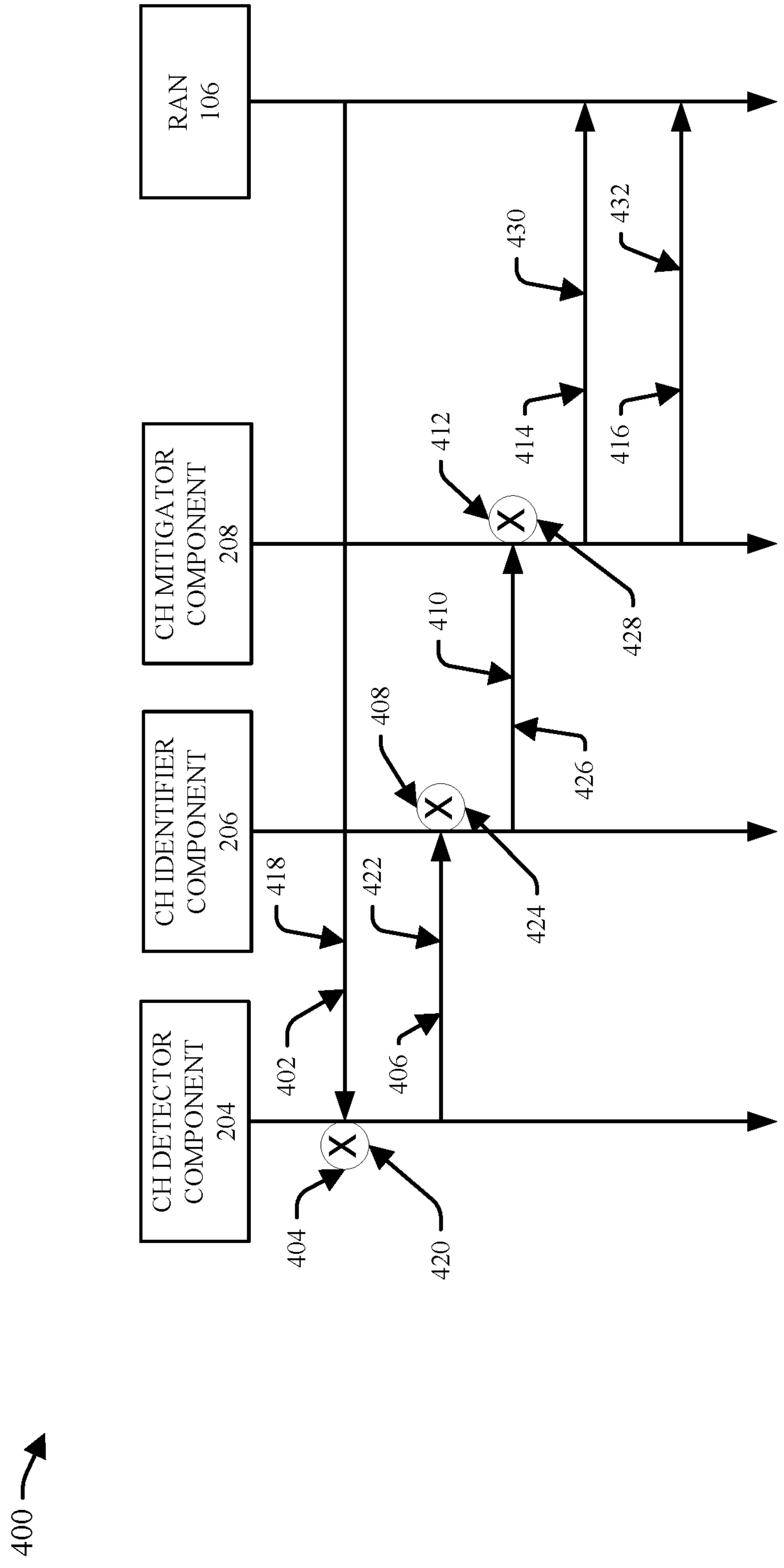
FIG. 4 illustrates a diagram of a non-limiting example process flow that can desirably detect whether conflicting handovers of a device between cells is occurring, predict or determine a conflicting handovers type of the conflicting handovers, and mitigate the conflicting handovers, in accordance with various aspects and embodiments of the disclosed subject matter.

Referring to FIG. 4 (along with FIGS. 1, 2, and 3), FIG. 4 illustrates a diagram of a non-limiting example process flow 400 that can desirably (e.g., automatically, dynamically, efficiently, reliably, suitably, enhancedly, or optimally) detect whether conflicting handovers of a device between cells is occurring, predict or determine a conflicting handovers type of the conflicting handovers, and mitigate the conflicting handovers, in accordance with various aspects and embodiments of the disclosed subject matter. The example process flow 400 can relate to operations that can be performed by the handover management component 126, including the CH detector component 204, CH identifier component 206, CH mitigator component 208, RAN nodes of the RAN 106, and/or other components of the core network 104, the base station(s) (e.g., base stations 108 or 110), or the cells (e.g., cells 112, 114, 116, or 118). The example process flow 400 can be automatically, dynamically, continuously, substantially continuously, or periodically performed, if and as desired. The example process flow 400 will be described herein with regard to certain example use case scenarios, although it is appreciated and understood that the example process flow 400, or a variation thereof, can be employed with regard to other types of use case scenarios using the techniques described herein.

In one example use case scenario, the cell 112 may operate a frequency division duplex (FDD) band, which can have a relatively higher uplink throughput, while the cell 116 can operate a time division duplex (TDD) band, which can have a relatively higher downlink throughput. In this example use case scenario, the device 120 can be concurrently (e.g., at the same time) operating or engaging in both downlink and uplink communications at a relatively high data rate. When the device 120 was camping on (e.g., connected to) the cell 112, the device 120 was experiencing and suffering from low downlink throughput, so the cell 112 handed off the device 120 to the cell 116, where the device 120 experienced better (e.g., higher) downlink throughput. However, while connected to the cell 116, the device 120 experienced and suffered from low uplink throughput, so the cell 116 handed off the device 120 back to the cell 112, because it was determined that the cell 112 could provide better (e.g., higher) uplink throughput, where the device 120 did experience better uplink throughput, but again experienced relatively lower downlink throughput, and, as a result, the device 120 continued to be repeatedly handed off between the cell 112 and the cell 116.

In some embodiments, the handover management component 126 can be deployed to detect, identify the type of, and mitigate the conflicting handovers of the device 120 between the cell 112 and cell 116. In certain embodiments, the SMO component 302 can deploy the CH detector xApp of the CH detector component 204, the CH identifier xApp of the CH identifier component 206, and/or the CH mitigator xApp of the CH mitigator component 208.

As indicated at reference numeral 402 of the example process flow 400, the CH detector component 204 can receive (e.g., collect or obtain) handover information relating to handovers of the device 120 between cells (e.g., cell 112, cell 116, and/or another cell(s)) and performance indicators (e.g., the first, second, and/or third performance indicators) associated with the device 120, the cells, and/or other devices (e.g., device 122 and/or 124) associated with the cells. In some embodiments, some of this information (e.g., some of the handover information and/or the performance indicators) already may have been received by the handover management component 126 and stored in the data store 202, and the CH detector component 204 can obtain this information from the data store 202.

As indicated at reference numeral 404 of the example process flow 400, the CH detector component 204 can detect that the device 120 is experiencing conflicting handovers between the cell 112 and the cell 116, based at least in part on the results of analyzing the handover information, the performance indicators (e.g., the first, second, and/or third performance indicators) associated with the device 120, the cells, and/or other devices (e.g., device 122 and/or 124) associated with the cells, and/or other desired information, such as described herein. As indicated at reference numeral 406 of the example process flow 400, the CH detector component 204 can communicate conflicting handovers detection information (e.g., conflicting handovers detection indicator or other conflicting handovers detection information) to the CH identifier component 206 to inform the CH identifier component 206 that conflicting handovers of the device 120 between the cell 112 and the cell 116 have been detected.

As indicated at reference numeral 408 of the example process flow 400, in response to receiving the conflicting handovers detection information, the CH identifier component 206 can predict or determine the conflicting handovers type of the conflicting handovers of the device 120 between the cell 112 and the cell 116, based at least in part on the results of analyzing the handover information, the performance indicators (e.g., the first, second, and/or third performance indicators) associated with the device 120, the cells, and/or other devices (e.g., device 122 and/or 124) associated with the cells, and/or other desired information, such as described herein. The CH identifier component 206 can obtain (e.g., retrieve, read, or receive) the handover information, the performance indicators, and/or the other desired information from the data store 202, the CH detector component 204, or another source for analysis by the CH identifier component 206. In this example scenario, based at least in part on the results of such analysis, the CH identifier component 206 can predict or determine that this conflicting handovers type is the first type of conflicting handovers relating to downlink and uplink conflicting handovers, such as described herein.

As indicated at reference numeral 410 of the example process flow 400, the CH identifier component 206 can communicate conflicting handovers type information (e.g., a conflicting handovers type indicator or value, or other conflicting handovers type information) to the CH mitigator component 208, wherein the conflicting handovers type information can indicate or specify that the detected conflicting handovers of the device 120 is the first type of conflicting handovers.

As indicated at reference numeral 412 of the example process flow 400, in response to receiving the conflicting handovers type information, the CH mitigator component 208 can determine one or more mitigation actions that can be performed to mitigate the conflicting handovers, based at least in part on the application of one or more rules of the group of rules and analysis of the conflicting handovers type information (e.g., the prediction or determination that the detected conflicting handovers of the device 120 between the cell 112 and the cell 116 is the first type of conflicting handovers), the performance indicators, and/or the other desired information, such as described herein. The CH mitigator component 208 can obtain the group of rules, the performance indicators, and/or the other desired information from the data store 202, the CH identifier component 206, or another source for analysis by the CH mitigator component 208. Based at least in part on the results of such analysis, the CH mitigator component 208 can determine which cell of the cell 112 or the cell 116 is the better (e.g., best) cell to which the device 120 is to be connected (e.g., the cell that can provide the best overall performance (e.g., QoS, QoE, and/or other performance) for the device 120 and/or the communication network 102; or the cell (e.g., cell 116) that can provide better downlink throughput to the device 120).

With regard to the one or more mitigation actions, as indicated at reference numeral 414 of the example process flow 400, the CH mitigator component 208 can instruct or inform the RAN 106 (e.g., cell 112 and/or cell 116 of the RAN 106) that the device 120 is to be connected to the better cell (e.g., cell 116, if that was determined to be the better cell). As indicated at reference numeral 416 of the example process flow 400, the CH mitigator component 208 also can instruct or inform the RAN 106 that handover or steering of the device 120 from the better cell to the other cell (e.g., cell 112, if that cell was not determined to be the better cell) is to be restricted (e.g., prevented, not permitted, not allowed, not authorized, or not to be performed) for at least the defined amount of time, at least with regard to issues relating to the first type of conflicting handovers (e.g., at least with regard to downlink and uplink related issues that would cause conflicting handovers of the device 120 between cell 112 and cell 116). The defined amount of time can be determined, set, or specified to a desired amount of time (e.g., by a user, such as a network operator; or as determined or set by the handover management component 126). In response to the instructions or information from the CH mitigator component 208, the RAN 106 (e.g., the cell 112 and cell 116) can operate to connect, or continue connection of, the device 120 on the better cell, and can restrict handover or steering of the device from the better cell to the other cell for at least the defined amount of time, at least with regard to issues relating to the first type of conflicting handovers.

In another example use case scenario, there can be the cell 112 and the cell 116, wherein the device 120 can have relatively poor coverage with the cell 112 when the device 120 is camped on (e.g., connected to) the cell 112, and where the cell 116 can have relatively poor uplink SINR with respect to the device 120 when the device 120 is camped on the cell 116. In this other example use case scenario, the cell 112 can hand over the device 120 to the cell 116, because the device 120 was experiencing and suffering from relatively poor coverage with the cell 112, and cell 116 is predicted or determined to provide better coverage to the device 120. When the device 120 is connected to the cell 116, the device 120 experienced and suffered from low SINR, so the cell 116 handed off the device 120 back to the cell 112, because it was predicted or determined that the cell 112 could provide better (e.g., higher) SINR to the device, where the device 120 did experience better SINR, but again experienced relatively poorer coverage, and, as a result, the device 120 continued to be repeatedly handed off between the cell 112 and the cell 116. For instance, in this other example scenario, the cell 112 can be predicting or determining that the cell 116 can provide better QoS to the device 120, but the cell 116 can be predicting or determining that the cell 112 can provide better QoS to the device 120.

As indicated at reference numeral 418 of the example process flow 400, the CH detector component 204 can receive handover information relating to handovers of the device 120 between cells (e.g., cell 112, cell 116, and/or another cell(s)) and performance indicators (e.g., the first, second, and/or third performance indicators) associated with the device 120, the cells, and/or other devices (e.g., device 122 and/or 124) associated with the cells. As disclosed, in some embodiments, some of this information (e.g., some of the handover information and/or the performance indicators) already may have been received by the handover management component 126 and stored in the data store 202, and the CH detector component 204 can obtain this information from the data store 202.

As indicated at reference numeral 420 of the example process flow 400, the CH detector component 204 can detect that the device 120 is experiencing conflicting handovers between the cell 112 and the cell 116, based at least in part on the results of analyzing the handover information, the performance indicators (e.g., the first, second, and/or third performance indicators) associated with the device 120, the cells, and/or other devices (e.g., device 122 and/or 124) associated with the cells, and/or other desired information, such as described herein. As indicated at reference numeral 422 of the example process flow 400, the CH detector component 204 can communicate conflicting handovers detection information (e.g., conflicting handovers detection indicator or other conflicting handovers detection information) to the CH identifier component 206 to inform the CH identifier component 206 that conflicting handovers of the device 120 between the cell 112 and the cell 116 has been detected.

As indicated at reference numeral 424 of the example process flow 400, in response to receiving the conflicting handovers detection information, the CH identifier component 206 can predict or determine the conflicting handovers type of the conflicting handovers of the device 120 between the cell 112 and the cell 116, based at least in part on the results of analyzing the handover information, the performance indicators (e.g., the first, second, and/or third performance indicators) associated with the device 120, the cells, and/or other devices (e.g., device 122 and/or 124) associated with the cells, and/or other desired information, such as described herein. In this example scenario, based at least in part on the results of such analysis, the CH identifier component 206 can predict or determine that this conflicting handovers type is the second type of conflicting handovers relating to QoS associated with the device 120 (e.g., the cell 112 and the cell 116 are each predicting that the other cell can provide better QoS to the device 120), such as described herein.

As indicated at reference numeral 426 of the example process flow 400, the CH identifier component 206 can communicate conflicting handovers type information (e.g., a conflicting handovers type indicator or value, or other conflicting handovers type information) to the CH mitigator component 208, wherein the conflicting handovers type information can indicate or specify that the detected conflicting handovers of the device 120 is the second type of conflicting handovers.

As indicated at reference numeral 428 of the example process flow 400, in response to receiving the conflicting handovers type information, the CH mitigator component 208 can determine one or more mitigation actions that can be performed to mitigate the conflicting handovers, based at least in part on the application of one or more rules of the group of rules and analysis of the conflicting handovers type information (e.g., the second type of conflicting handovers), the performance indicators, and/or the other desired information, such as described herein. For instance, based at least in part on the results of such analysis, the CH mitigator component 208 can determine which cell of the cell 112 or the cell 116 is the better (e.g., best) cell to which the device 120 is to be connected (e.g., the cell that can provide the best overall performance (e.g., best QoS, coverage, QoE, and/or other performance) for the device 120 and/or the communication network 102).

With regard to the one or more mitigation actions, as indicated at reference numeral 430 of the example process flow 400, the CH mitigator component 208 can instruct or inform the RAN 106 (e.g., cell 112 and/or cell 116 of the RAN 106) that the device 120 is to be connected to the better cell (e.g., cell 116, if that was determined to be the better cell). As indicated at reference numeral 432 of the example process flow 400, the CH mitigator component 208 also can instruct or inform the RAN 106 that handover or steering of the device 120 from the better cell to the other cell (e.g., cell 112, if that cell was not determined to be the better cell) is to be restricted (e.g., prevented, not permitted, not allowed, not authorized, or not to be performed) for at least the defined amount of time, at least with regard to issues relating to the second type of conflicting handovers (e.g., at least with regard to QoS or coverage related issues that would cause conflicting handovers of the device 120 between cell 112 and cell 116). In response to the instructions or information from the CH mitigator component 208, the RAN 106 (e.g., the cell 112 and cell 116) can operate to connect, or continue connection of, the device 120 on the better cell, and can restrict handover or steering of the device from the better cell to the other cell for at least the defined amount of time, at least with regard to issues relating to the second type of conflicting handovers.

Figure 5:
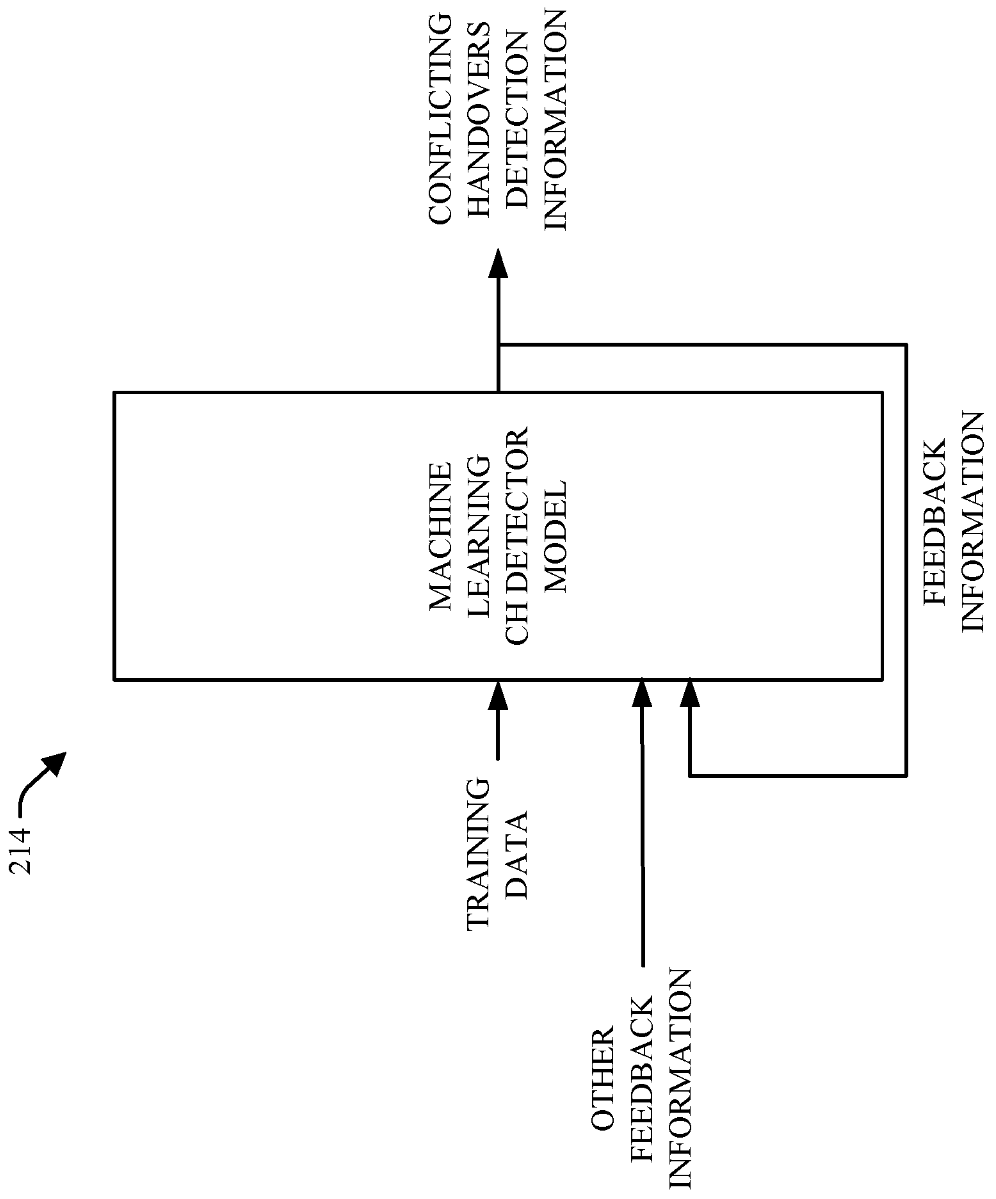
FIG. 5 depicts a block diagram of a non-limiting example machine learning conflicting handovers (CH) detector model that can desirably detect or determine whether a device is experiencing conflicting handovers between cells, in accordance with various aspects and embodiments of the disclosed subject matter.

Turning to FIG. 5 (along with FIGS. 1 and 2), FIG. 5 depicts a block diagram of a non-limiting example machine learning CH detector model 214 that can desirably (e.g., automatically, dynamically, efficiently, reliably, suitably, enhancedly, or optimally) detect or determine whether a device is experiencing conflicting handovers between cells, in accordance with various aspects and embodiments of the disclosed subject matter. The trainer component 212 can be employed to train the machine learning CH detector model 214. The trainer component 212 can train the machine learning CH detector model 214 on features indicating conflicting handovers of devices between cells under various conditions in various situations. As disclosed, the output of the machine learning CH detector model 214 can comprise conflicting handovers detection information relating to detection of conflicting handovers of a device (e.g., device 120) between cells (e.g., cell 112 and cell 116 (and/or another cell(s)).

In some embodiments, the trainer component 212 can input (e.g., apply) initial input data to the machine learning CH detector model 214, wherein the initial input data can comprise, for example, a set of training data. The set of training data can comprise or relate to, for example, previous (e.g., historical) conflicting handovers of devices between cells, previous respective performance indicators associated with respective devices and respective cells under respective conditions in respective situations where conflicting handovers of a device between cells occurred and/or where non-conflicting handovers of a device between cells occurred, and/or other desired training data. For instance, the set of training data can comprise or relate to a subset of positive training data that can comprise information (e.g., handover information, performance indicators, and/or other information) relating to instances where conflicting handovers of a device between cells occurred under respective conditions in respective situations, and a subset of negative training data that can comprise information (e.g., handover information, performance indicators, and/or other information) relating to instances where non-conflicting (e.g., acceptable or suitable) handovers of a device between cells occurred under other respective conditions in other respective situations.

The machine learning CH detector model 214 can analyze and operate on the initial input data to learn features indicating when conflicting handovers of devices between cells are occurring and/or other features indicating when handovers of devices between cells are not conflicting, including modeling and learning to detect, determine, or predict whether conflicting handovers of a device between cells is occurring, and, as a result, generate (e.g., create) the trained machine learning CH detector model 214. In that regard, the machine learning CH detector model 214 can learn relationships between handovers of devices between cells, performance indicators associated with the devices and the cells, and the occurrences of conflicting handovers of the devices between cells.

Since the components, elements, and resources of a communication network can differ from one communication network to another communication network, in accordance with various embodiments, training of a machine learning CH detector model 214 (e.g., by the trainer component 212) can be customized (e.g., tailored) to the particular communication network before deployment. For instance, a first set of training data relating to a first communication network can be input to a first machine learning CH detector model (e.g., by the trainer component 212) to train the first machine learning CH detector model for use in connection with detecting conflicting handovers of devices between cells for the first communication network, and a second set of training data relating to a second communication network can be input to a second machine learning CH detector model (e.g., by the trainer component 212 (or another same or similar trainer component)) to train the second machine learning CH detector model for use in connection with detecting conflicting handovers of devices between cells for the second communication network.

The trainer component 212 can continue to train, update, and refine (e.g., fine tune and/or improve) the trained machine learning CH detector model 214 over time as additional information becomes available. For instance, as operation of the communication network 102 continues, additional information (e.g., handover information, performance indicators, and/or other information) can be obtained by the handover management component 126 (e.g., employing a feedback component 222), and the feedback component 222 can communicate such feedback information (e.g., the additional information) to the trainer component 212, which can input that feedback information into the trained machine learning CH detector model 214. Also, the feedback component 222 can obtain information regarding respective conflicting handovers detection information output by the trained machine learning CH detector model 214 during respective analyses of information, and can feed back (e.g., provide or communicate) such information back to the trainer component 212, which can input such information into the input (e.g., input port(s)) of the trained machine learning CH detector model 214. The feedback component 222 also can receive, from a user(s), user feedback information relating to the detection of conflicting handovers of devices between cells, or other user feedback information, and can communicate the user feedback information to the trainer component 212, which can input that information into the trained machine learning CH detector model 214.

The trained machine learning CH detector model 214 can analyze and operate on such feedback or additional information to further learn features indicating when conflicting handovers of devices between cells are occurring, and can further model and learn (e.g., enhance modeling and learning) to detect or determine whether conflicting handovers of a device between cells is occurring, and, as a result, refine and enhance the trained machine learning CH detector model 214.

Figure 6:
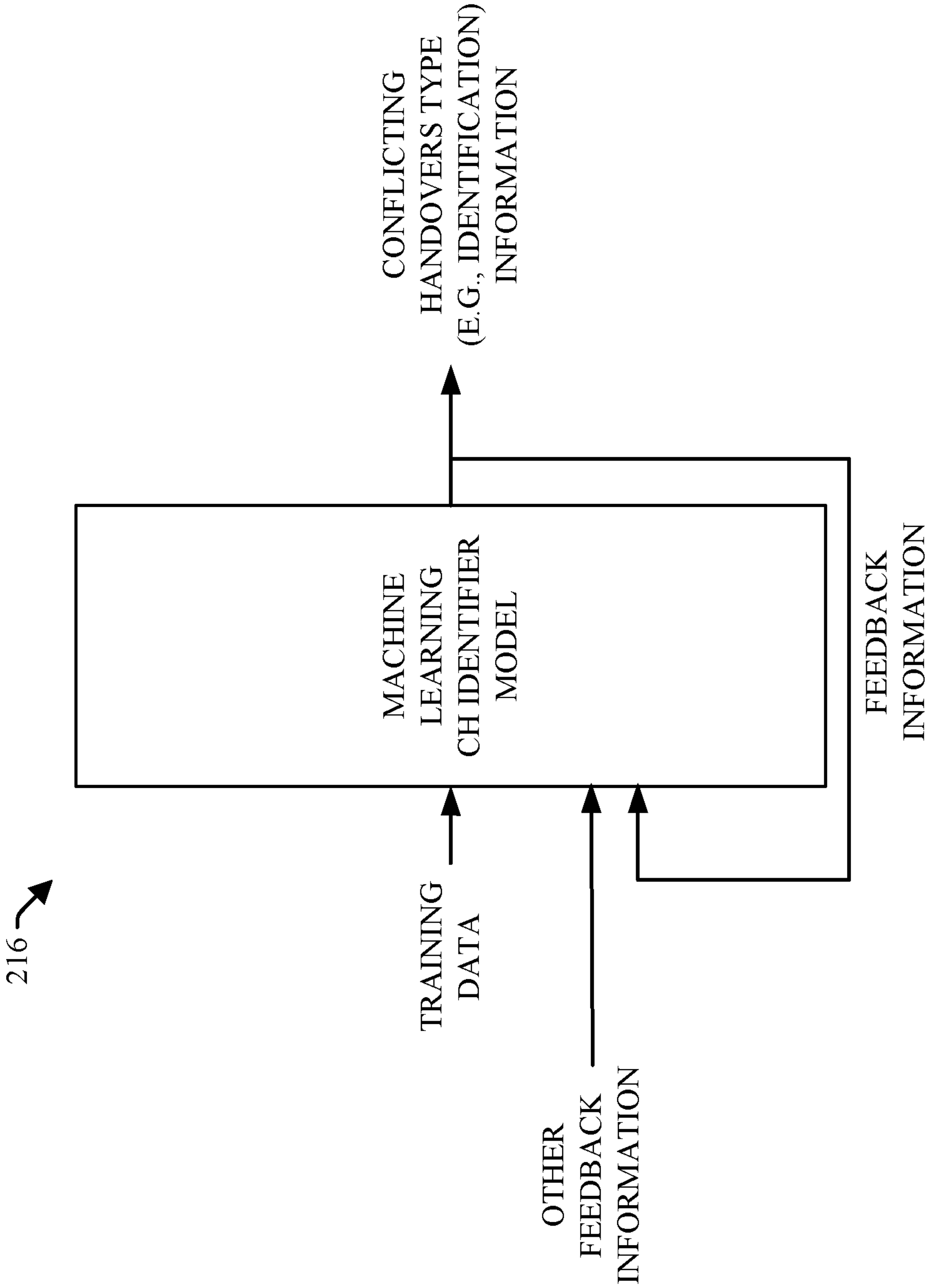
FIG. 6 illustrates a block diagram of a non-limiting example machine learning CH identifier model that can desirably predict, determine or identify a conflicting handovers type of conflicting handovers of a device between cells, in accordance with various aspects and embodiments of the disclosed subject matter.

Turning to FIG. 6 (along with FIGS. 1 and 2), FIG. 6 illustrates a block diagram of a non-limiting example machine learning CH identifier model 216 that can desirably (e.g., automatically, dynamically, efficiently, reliably, suitably, enhancedly, or optimally) predict, determine or identify a conflicting handovers type of conflicting handovers of a device between cells, in accordance with various aspects and embodiments of the disclosed subject matter. The trainer component 212 can be employed to train the machine learning CH identifier model 216. The trainer component 212 can train the machine learning CH identifier model 216 on respective features indicating respective types of conflicting handovers of devices between cells under various conditions in various situations. As disclosed, the output of the machine learning CH identifier model 216 can comprise conflicting handovers type information (e.g., conflicting handovers identification information) relating to prediction or determination of a type of conflicting handovers of a device (e.g., device 120) between cells (e.g., cell 112 and cell 116 (and/or another cell(s)).

In some embodiments, the trainer component 212 can input (e.g., apply) initial input data to the machine learning CH identifier model 216, wherein the initial input data can comprise, for example, a set of training data. The set of training data can comprise or relate to, for example, previous conflicting handovers of devices between cells, previous respective performance indicators associated with respective devices and respective cells under respective conditions in respective situations where respective types of conflicting handovers of devices between cells occurred, and/or other desired training data. For instance, the set of training data can comprise or relate to a first subset of training data that can comprise first information (e.g., first handover information, first performance indicators, and/or other first information) relating to instances where the first type of conflicting handovers of devices between cells occurred under respective first conditions in respective first situations, a second subset of training data that can comprise second information (e.g., second handover information, second performance indicators, and/or other second information) relating to instances where the second type of conflicting handovers of devices between cells occurred under respective second conditions in respective second situations, a third subset of training data that can comprise third information (e.g., third handover information, third performance indicators, and/or other third information) relating to instances where the third type of conflicting handovers of devices between cells occurred under respective third conditions in respective third situations, and/or another subset of training data that can comprise other information (e.g., other handover information, other performance indicators, and/or other information) relating to instances where another type of conflicting handovers of devices between cells occurred under respective other conditions in respective other situations.

The machine learning CH identifier model 216 can analyze and operate on the initial input data to learn respective features indicating the respective types of conflicting handovers of devices between cells are occurring, including modeling and learning to predict or determine the respective types of conflicting handovers of devices between cells that are occurring, and, as a result, generate (e.g., create) the trained machine learning CH identifier model 216. In that regard, the machine learning CH identifier model 216 can learn relationships between handovers of devices between cells, performance indicators associated with the devices and the cells, and the respective types of conflicting handovers of devices between cells.

Since the components, elements, and resources of a communication network can differ from one communication network to another communication network, in accordance with various embodiments, training of a machine learning CH identifier model 216 (e.g., by the trainer component 212) can be customized (e.g., tailored) to the particular communication network before deployment. For instance, a first set of training data relating to a first communication network can be input to a first machine learning CH identifier model (e.g., by the trainer component 212) to train the first machine learning CH identifier model for use in connection with predicting or determining respective types of conflicting handovers of devices between cells for the first communication network, and a second set of training data relating to a second communication network can be input to a second machine learning CH identifier model (e.g., by the trainer component 212 (or another same or similar trainer component)) to train the second machine learning CH detector model for use in connection with predicting or determining respective types of conflicting handovers of devices between cells for the second communication network.

The trainer component 212 can continue to train, update, and refine (e.g., fine tune and/or improve) the trained machine learning CH identifier model 216 over time as additional information becomes available. For instance, as operation of the communication network 102 continues, additional information (e.g., handover information, performance indicators, and/or other information) can be obtained by the handover management component 126 (e.g., employing the feedback component 222), and the feedback component 222 can communicate such feedback information (e.g., the additional information) to the trainer component 212, which can input that feedback information into the trained machine learning CH identifier model 216. Also, the feedback component 222 can obtain information regarding respective conflicting handovers type information output by the trained machine learning CH identifier model 216 as a result of respective analyses of information by the trained machine learning CH identifier model 216, and can feed back (e.g., provide or communicate) such information back to the trainer component 212, which can input such information into the input (e.g., input port(s)) of the trained machine learning CH identifier model 216. The feedback component 222 also can receive, from a user(s), user feedback information relating to the prediction or determination of respective types of conflicting handovers of devices between cells, or other user feedback information, and can communicate the user feedback information to the trainer component 212, which can input that information into the trained machine learning CH identifier model 216. The trained machine learning CH identifier model 216 can analyze and operate on such feedback or additional information to further learn respective features indicating the respective types of conflicting handovers of devices between cells that can occur under various conditions in various situations, and can further model and learn (e.g., enhance modeling and learning) to predict or determine the respective types of conflicting handovers of devices between cells that occur, and, as a result, refine and enhance the trained machine learning CH identifier model 216.

Figure 7:
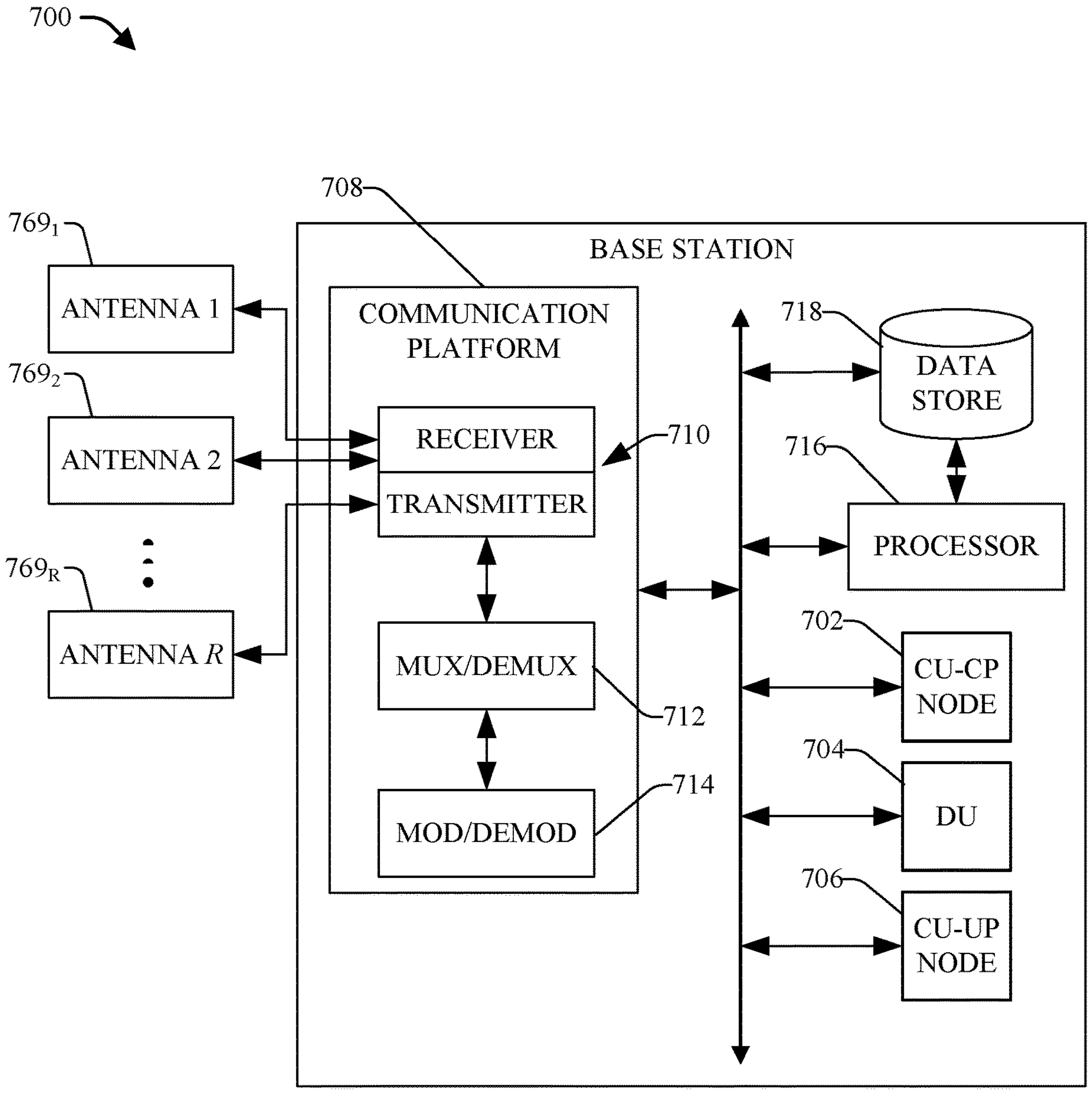
FIG. 7 depicts a diagram of a non-limiting example base station that can desirably facilitate connections and communication of information associated with devices, in accordance with various aspects and embodiments of the disclosed subject matter.

Turning to FIG. 7, FIG. 7 depicts a diagram of a non-limiting example base station 700 that can desirably facilitate (e.g., enable) connections (e.g., wireless connections) and communication of information associated with devices, in accordance with various aspects and embodiments of the disclosed subject matter. In some embodiments, the base station 700 can be a 5G or other NR base station (e.g., gNB or other NR-type or xG base station, wherein x can be a number greater than 5). In other embodiments, the base station 700 can be a 4G or LTE base station, or some other type of base station (e.g., other type of access point).

With regard to a 5G or other NR base station, the base station 700 can comprise a CU-CP node 702 (e.g., a gNB or other NR-NB CU-CP node), one or more DUs (e.g., a gNB or other NR-NB DUs), including DU 704, a desired number of CU-UP nodes (e.g., a gNB or other NR-NB CU-UP nodes), including CU-UP node 706, and/or other network equipment. The CU-CP node 702 can be associated or interfaced with the DUs (e.g., DU 704) via an interface (e.g., F1-C interface) or connection. The CU-CP node 702 can be associated or interfaced with the CU-UP nodes (e.g., CU-UP node 706) via an interface (e.g., E1 interface) or connection. The one or more CU-UP nodes (e.g., CU-UP node 706) can be associated or interfaced with the one or more DUs (e.g., DU 704) via an interface (e.g., F1-U interface) or connection.

A DU (e.g., DU 704) can provide support for lower layers of a protocol stack. For instance, a DU (e.g., DU 704) can be a logical node that can host or handle baseband (e.g., PHY) and L2 (e.g., MAC and RLC layer) functionality associated with the base station 700. A CU-UP node (e.g., CU-UP node 706) can be a logical node that can host or handle data traffic between the core network 104 (e.g., 5G or other NR or xG core network) and the DU(s) (e.g., DU 704) to which the particular CU-UP is connected. The CU-CP node 702 can be a logical node that can host or handle L3 (e.g., RRC and packet data convergence protocol (PDCP) layer) control plane functionality associated with the base station 700.

In some embodiments, a device(s) (e.g., device(s) 120, 122, or 124) can be connected to the base station 700, via the DU 704, wherein the CU-UP node 706 and the DU 704 can be serving the device by performing or facilitating performing downlink data transfers of downlink data to the device from a data source (e.g., a service and/or another device, or a network component of the communication network 102 or core network 104 (e.g., via the UPF node)), and uplink data transfers of uplink data from the device to a desired destination (e.g., the data source) via the base station 700.

The base station 700 can receive and transmit signal(s) from and to wireless devices like access points (e.g., base stations, femtocells, picocells, or other type of access point), access terminals (e.g., UEs), wireless ports and routers, and the like, through a set of antennas $\mathbf{769_1}$-$\mathbf{769_R}$. In an aspect, the antennas $\mathbf{769_1}$-$\mathbf{769_R}$ can be a part of a communication platform 708, which comprises electronic components and associated circuitry that can provide for processing and manipulation of received signal(s) and signal(s) to be transmitted. In an aspect, the communication platform 708 can include a receiver/transmitter 710 that can convert signal from analog to digital upon reception, and from digital to analog upon transmission. In addition, receiver/transmitter 710 can divide a single data stream into multiple, parallel data streams, or perform the reciprocal operation. In accordance with various embodiments, the communication platform 708 can be, can comprise, or can be associated with an RU (e.g., a gNB or other NR-NB RU node).

In an aspect, coupled to receiver/transmitter 710 can be a multiplexer/demultiplexer (mux/demux) 712 that can facilitate manipulation of signal in time and frequency space. The mux/demux 712 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 712 can scramble and spread information (e.g., codes) according to substantially any code known in the art, e.g., Hadamard-Walsh codes, Baker codes, Kasami codes, polyphase codes, and so on. A modulator/demodulator (mod/demod) 714 also can be part of the communication platform 708, and can modulate information according to multiple modulation techniques, such as frequency modulation, amplitude modulation (e.g., M-ary quadrature amplitude modulation (QAM), with M a positive integer), phase-shift keying (PSK), and the like.

The base station 700 also can comprise a processor(s) 716 that can be configured to confer and/or facilitate providing functionality, at least partially, to substantially any electronic component in or associated with the base station 700. For instance, the processor(s) 716 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, and/or other operations on data.

In another aspect, the base station 700 can include a data store 718 that can store data structures; code instructions; rate coding information; information relating to measurement of radio link quality or reception of information related thereto; information relating to devices, communication conditions or performance indicators associated with devices (e.g., SINR, RSRP, RSRQ, channel quality indicator (CQI), and/or other wireless communications metrics or parameters) associated with devices, metadata, policies and rules, users, applications, services, handover management criteria, traffic flows, signaling, algorithms (e.g., handover management algorithm(s), uplink grant scheduling algorithm(s), downlink scheduling algorithm(s), or other algorithm(s)), protocols, interfaces, tools, and/or other information; white list information, information relating to managing or maintaining the white list; system or device information like policies and specifications; code sequences for scrambling; spreading and pilot transmission; floor plan configuration; base station deployment and frequency plans; scheduling policies; and so on. The processor(s) 716 can employ one or more processors (e.g., one or more CPUs), microprocessors, or controllers) that can process information, and can be coupled to the data store 718 in order to store and retrieve at least some of the information (e.g., information, such as algorithms, relating to multiplexing/demultiplexing or modulation/demodulation; information relating to radio link levels; information relating to devices, communication conditions associated with devices, metadata, communication devices, policies and rules, users, applications, services, handover management criteria, traffic flows, signaling, algorithms (e.g., handover management algorithm(s), uplink grant scheduling algorithm(s), downlink scheduling algorithm(s), or other algorithm(s)), protocols, interfaces, tools, and/or other information) desired to operate and/or confer functionality to the communication platform 708 and/or other operational components of the base station 700.

The data store 718 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 8:
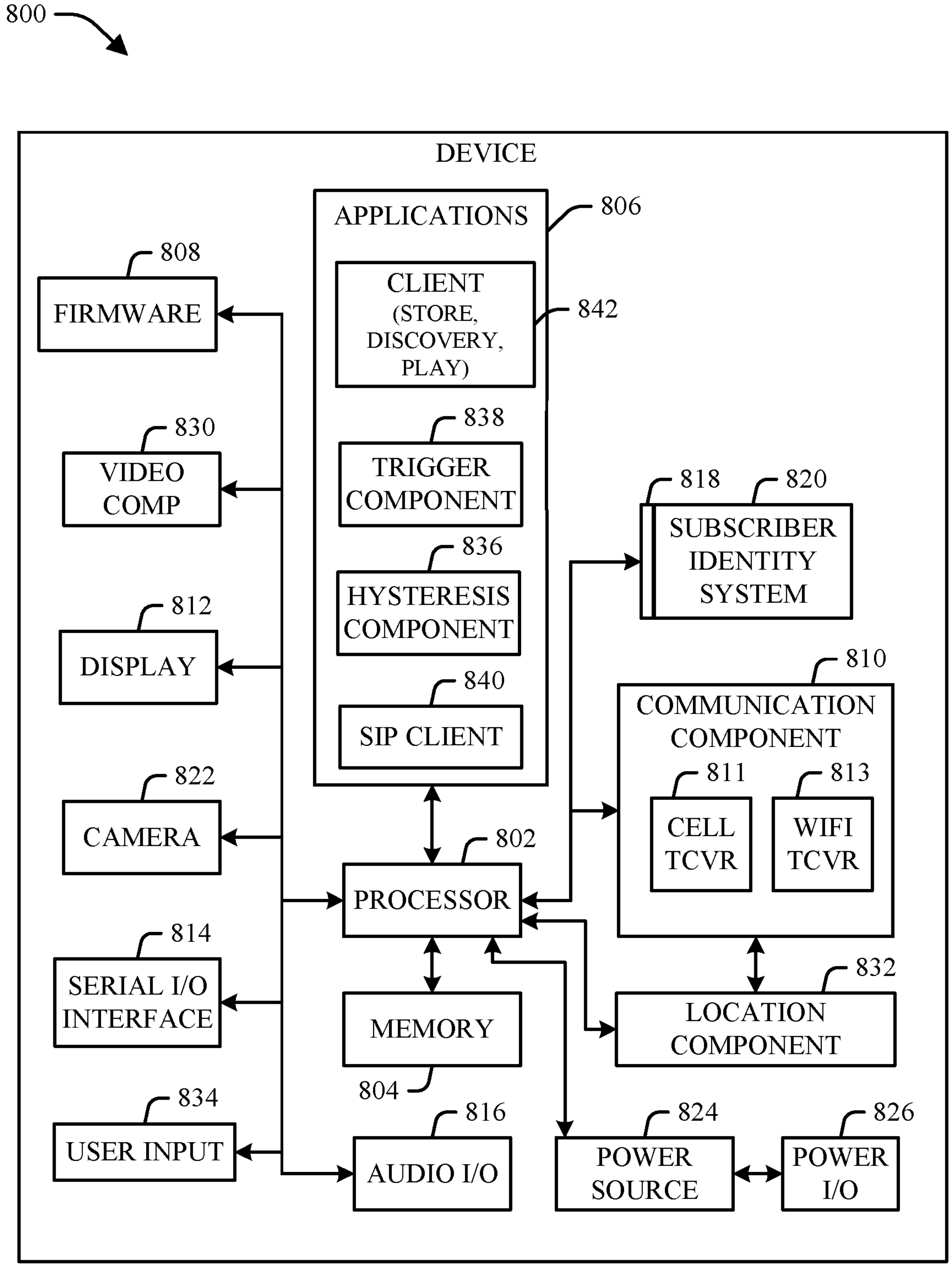
FIG. 8 illustrates a diagram of a non-limiting example device that can be operable to engage in a system architecture that facilitates wireless communications according to one or more embodiments described herein, in accordance with various aspects and embodiments of the disclosed subject matter.

Referring to FIG. 8, FIG. 8 illustrates a diagram of a non-limiting example device 800 (e.g., wireless or mobile phone, electronic pad or tablet, electronic eyewear, electronic watch, other electronic bodywear, IoT device, or other type of communication device or UE) that can be operable to engage in a system architecture that facilitates wireless communications according to one or more embodiments described herein, in accordance with various aspects and embodiments of the disclosed subject matter. Although a device is illustrated herein, it will be understood that other devices can be a communication device, and that the device 800 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device, such as the device 800, can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

The device 800 can include a processor(s) 802 for controlling and processing all onboard operations and functions. The processor(s) 802 can comprise one or more processors (e.g., one or more central processing units (CPUs)), microprocessors, or controllers) that can process information associated with the device 800. A memory 804 can interface to the processor(s) 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor(s) 802 from either or both the memory 804 or/and the firmware 808. The firmware 808 can also store startup code for execution in initializing the device 800. A communication component 810 interfaces to the processor(s) 802 to facilitate wired/wireless communication with external systems, e.g., cellular networks, VoIP networks, and so on. Here, the communication component 810 can also include a suitable cellular transceiver 811 (e.g., a global system for mobile communication (GSM), orthogonal frequency division multiple access (OFDMA), 4G, LTE, 5G, other NR, or other type of transceiver) and/or an unlicensed transceiver 813 (e.g., Wi-Fi, WiMax) for corresponding signal communications. The device 800 can be a device such as a cellular telephone, a PDA with mobile communications capabilities, and messaging-centric devices. The communication component 810 also facilitates communications reception from terrestrial radio networks (e.g., broadcast), digital satellite radio networks, and Internet-based radio services networks.

The device 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor(s) 802 to facilitate wired and/or wireless serial communications (e.g., USB, and/or IEEE 1394) through a hardwire connection, and other serial input devices (e.g., a keyboard, keypad, and mouse). This supports updating and troubleshooting the device 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The device 800 can include a slot interface 818 for accommodating a SIC (Subscriber Identity Component) in the form factor of a card Subscriber Identity Module (SIM) or universal SIM 820, and interfacing the SIM card 820 with the processor(s) 802. However, it is to be appreciated that the SIM card 820 can be manufactured into the device 800, and updated by downloading data and software.

The device 800 can process IP data traffic through the communication component 810 to accommodate IP traffic from an IP network such as, for example, the Internet, a corporate intranet, a home network, a person area network, etc., through an ISP or broadband cable provider. Thus, VoIP traffic can be utilized by the device 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The device 800 also includes a power source 824 in the form of batteries and/or an AC power subsystem, which power source 824 can interface to an external power system or charging equipment (not shown) by a power I/O component 826.

The device 800 can also include a video component 830 for processing video content received and, for recording and transmitting video content. For example, the video component 830 can facilitate the generation, editing and sharing of video quotes. A location tracking component 832 facilitates geographically locating the device 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the device 800 to support SIP protocols and register the subscriber with the SIP registrar server. The applications 806 can also include a client 842 that provides at least the capability of discovery, play and store of multimedia content, for example, music.

The device 800, as indicated above related to the communication component 810, includes an indoor network radio transceiver 813 (e.g., Wi-Fi transceiver). This function supports the indoor radio link, such as IEEE 802.11, for the dual-mode GSM device (e.g., device 800). The device 800 can accommodate at least satellite radio services through a device (e.g., handset device) that can combine wireless voice and digital radio chipsets into a single device (e.g., single handheld device).

It is to be appreciated and understood that one or more components (e.g., the devices, handover management component, base station, core network, or other component) of the systems (e.g., system 100, system 300, or other system), process flows (e.g., process flow 400 or other process flow), or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 10:
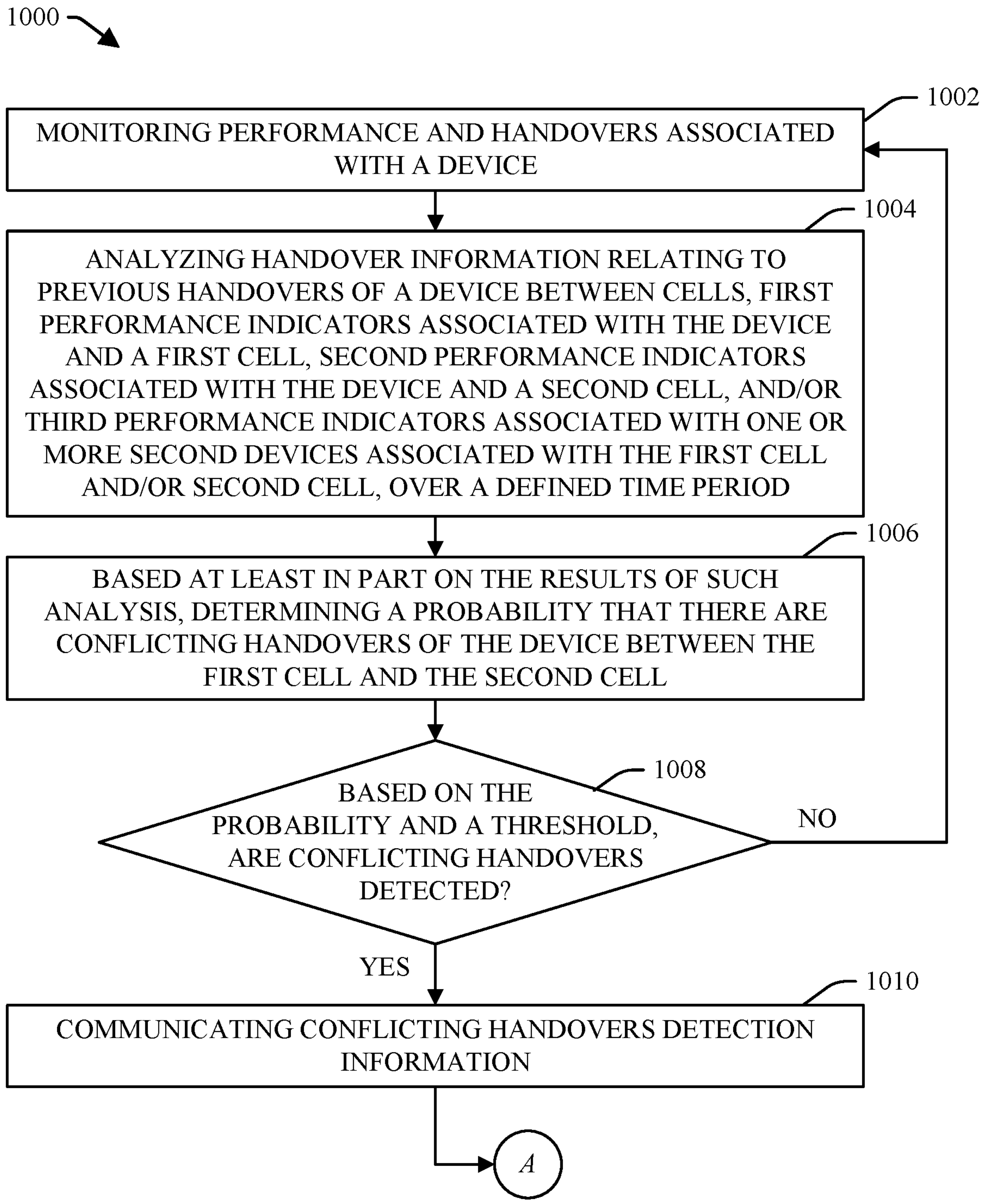
FIG. 10 depicts a flow chart of an example method that can desirably manage, detect, facilitate predicting or identifying a type of, and facilitate mitigating conflicting handovers of a device between cells of a communication network, in accordance with various aspects and embodiments of the disclosed subject matter.

In view of the example systems and/or devices described herein, example methods that can be implemented in accordance with the disclosed subject matter can be further appreciated with reference to flowcharts in FIGS. 9-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 9 illustrates a flow chart of an example method 900 that can desirably (e.g., automatically, dynamically, predictively, suitably, reliably, efficiently, enhancedly, and/or optimally) manage, detect, predict a type of, and facilitate mitigating conflicting handovers of a device between cells of a communication network, in accordance with various aspects and embodiments of the disclosed subject matter. The method 900 can be employed by, for example, a system comprising the handover management component, which can comprise or be associated with the CH detector component, the CH identifier component, the CH mitigator component, the processor component, the data store, and/or other components.

At 902, a determination can be made that there are conflicting handovers of a device between a first cell and a second cell based at least in part on handover information relating to previous handovers of the device between cells, first performance indicators associated with the device and the first cell, second performance indicators associated with the device and the second cell, and/or third performance indicators associated with one or more second devices associated with the first cell and/or second cell, over a defined time period. The CH detector component can analyze the handover information, the first performance indicators, the second performance indicators, and/or the third performance indicators, over the defined time period. Based at least in part on the results of such analysis, the CH detector component can determine whether there are conflicting handovers of the device between the first cell and the second cell, such as described herein. In some embodiments, the CH detector component can employ a trained machine learning CH detector model that can perform a machine learning-based analysis on the handover information, the first performance indicators, the second performance indicators, and/or the third performance indicators, and, based at least in part on the results of such machine learning-based analysis, the trained machine learning CH detector model can determine or detect whether there are conflicting handovers of the device between the first cell and the second cell, and/or can determine a probability that there are conflicting handovers of the device between the first cell and the second cell, such as described herein. In some instances, based at least in part on the analysis results, the CH detector component can determine that there are conflicting handovers of the device between the first cell and the second cell because the analysis of such information indicates that such conflicting handovers are occurring or have occurred.

At 904, in response to determining that there are the conflicting handovers of the device between the first cell and the second cell, from a group of types of conflicting handovers of devices, a type of the conflicting handovers of the device between the first cell and the second cell can be predicted based at least in part on the handover information, the first performance indicators, the second performance indicators, and/or the third performance indicators. The CH identifier component can analyze the handover information, the first performance indicators, the second performance indicators, and/or the third performance indicators. In some embodiments, the CH identifier component can employ a trained machine learning CH identifier model to perform a machine learning-based analysis on the handover information, the first performance indicators, the second performance indicators, and/or the third performance indicators, to facilitate predicting the type of the conflicting handovers of the device between the first cell and the second cell. Based at least in part on the results of the analysis (e.g., machine learning-based analysis or other analysis), the CH identifier component and/or the trained machine learning CH identifier model can predict or determine the type of the conflicting handovers of the device between the first cell and the second cell, such as described herein.

Based at least in part on results of an analysis of the type of the conflicting handovers, the first performance indicators, the second performance indicators, a group of rules relating to mitigation of conflicting handovers of devices, and/or other information, the CH mitigator component can determine a mitigation action that can mitigate, prevent, or otherwise stop the conflicting handovers of the device between the first cell and the second cell, for at least a desired amount of time. In some embodiments, as part of determining the mitigation action, the CH mitigator component can determine which of the first cell and the second cell the device is to be connected, such as described herein.

FIG. 10 depicts a flow chart of an example method 1000 that can desirably (e.g., automatically, dynamically, predictively, suitably, reliably, efficiently, enhancedly, and/or optimally) manage, detect, facilitate predicting or identifying a type of, and facilitate mitigating conflicting handovers of a device between cells of a communication network, in accordance with various aspects and embodiments of the disclosed subject matter. The method 1000 can be employed by, for example, a system comprising the handover management component, which can comprise or be associated with the CH detector component, the CH identifier component, the CH mitigator component, the processor component, the data store, and/or other components.

At 1002, performance and handovers associated with a device can be monitored. The handover management component can monitor the performance of or associated with the device, and the handovers, if any, of the device between cells.

At 1004, handover information relating to previous handovers of a device between cells, first performance indicators associated with the device and a first cell, second performance indicators associated with the device and a second cell, and/or third performance indicators associated with one or more second devices associated with the first cell and/or second cell, over a defined time period, can be analyzed. From the monitoring, the CH detector component (e.g., employing the trained machine learning CH detector model) can analyze (e.g., can perform a machine learning-based analysis on) the handover information, the first performance indicators, the second performance indicators, and/or the third performance indicators, over the defined time period.

At 1006, based at least in part on the results of such analysis, a probability that there are conflicting handovers of the device between the first cell and the second cell can be determined. The CH detector component (e.g., employing the trained machine learning CH detector model) can determine the probability (e.g., a probability value) that there are conflicting handovers of the device between the first cell and the second cell occurring or that have occurred, such as described herein.

At 1008, a determination can be made regarding whether there are conflicting handovers of the device between the first cell and the second cell based at least in part on the probability and a defined threshold probability relating to conflicting handovers of devices between cells. The CH detector component can determine or detect whether there are conflicting handovers of the device between the first cell and the second cell based at least in part on the probability (e.g., the probability value) and the defined threshold probability (e.g., defined threshold probability value). For instance, the CH detector component can compare the probability and the defined threshold probability to determine whether the probability satisfies (e.g., meets or exceeds; is at or greater than) the defined threshold probability. If the probability satisfies the defined threshold probability, this can indicate that there are conflicting handovers of the device between the first cell and the second cell, whereas, if the probability does not satisfy the defined threshold probability, this can indicate that conflicting handovers of the device between the first cell and the second cell are not detected.

If it is determined that conflicting handovers of the device between the first cell and the second cell are not detected, the method 1000 can return to reference numeral 1002, wherein the performance and the handovers associated with the device can continue to be monitored, and the method 1000 can proceed from that point. For instance, if, based at least in part on the result of the comparison of the probability and the defined threshold probability, the CH detector component determines that the probability does not satisfy the defined threshold probability, the CH detector component can determine that conflicting handovers of the device between the first cell and the second cell are not detected. At this point, the handover management component can continue to monitor the performance of or associated with the device, and the handovers of the device between cells.

If, instead, at 1008, it is determined that conflicting handovers of the device between the first cell and the second cell are detected, at 1010, conflicting handovers detection information can be communicated. For instance, if, instead, the CH detector component determines that conflicting handovers of the device between the first cell and the second cell are detected, the CH detector component can generate conflicting handovers detection information (e.g., conflicting handovers detection indicator or other conflicting handovers detection information), and can communicate the conflicting handovers detection information to the CH identifier component to inform the CH identifier component that conflicting handovers of the device between the first cell and the second cell have been detected. In some embodiments, at this point, the method 900 can proceed to reference point A, wherein method 1100 of FIG. 11 can proceed from reference point A to identify or determine the type of the conflicting handovers and mitigate the conflicting handovers, such as described herein and as shown in FIG. 11.

FIG. 11 illustrates a flow chart of an example method 1100 that can desirably (e.g., automatically, dynamically, predictively, suitably, reliably, efficiently, enhancedly, and/or optimally) manage, predict or identify a type of, and mitigate conflicting handovers of a device between cells of a communication network, in accordance with various aspects and embodiments of the disclosed subject matter, in accordance with various aspects and embodiments of the disclosed subject matter. The method 1100 can be employed by, for example, a system (e.g., the network monitoring system) comprising the handover management component, which can comprise or be associated with the CH detector component, the CH identifier component, the CH mitigator component, the processor component, the data store, and/or other components. In some embodiments, the method 1100 can proceed from reference point A of the method 1000 of FIG. 10, such as described herein and shown in FIG. 10.

At 1102, the handover information relating to previous handovers of the device between cells, the first performance indicators associated with the device and the first cell, the second performance indicators associated with the device and the second cell, and/or the third performance indicators associated with one or more second devices associated with the first cell and/or second cell, over the defined time period, can be analyzed. To facilitate identifying or determining the type of the conflicting handovers, the CH identifier component (e.g., employing a trained machine learning CH identifier model) can analyze (e.g., can perform a machine learning-based analysis on) the handover information, the first performance indicators, the second performance indicators, and/or the third performance indicators, over the defined time period.

At 1104, based at least in part on the results of the analysis, a type of the conflicting handovers of the device between the first cell and the second cell can be predicted. For instance, the CH identifier component (e.g., employing the trained machine learning CH identifier model) can predict, identify, or determine the type of the conflicting handovers of the device between the first cell and the second cell, based at least in part on the results of the analysis (e.g., the machine learning-based analysis), such as described herein. For instance, the CH identifier component (e.g., employing the trained machine learning CH identifier model) can determine respective probabilities (e.g., respective probability values) that the respective types of conflicting handovers of the device are occurring, and can predict the type of conflicting handovers of the device based at least in part on (e.g., as) which type of conflicting handovers of the device has the highest probability of being the one that occurred. The types of conflicting handovers of devices can comprise, for example, a first type of conflicting handovers of devices relating to downlink and uplink performance associated with the device with respect to the first cell and the second cell, a second type of conflicting handovers of devices relating to a QoS associated with the device with respect to the first cell and the second cell, a third type of conflicting handovers of devices relating to load balancing associated with one of the first cell or the second cell, and the QoS associated with the device and another one of the first cell or the second cell, and/or another type of conflicting handovers of devices between cells.

At 1106, a determination can be made regarding which of the first cell or the second cell is the more desirable cell to which the device is to be connected based at least in part on a group of rules relating to mitigating conflicting handovers of devices and the results of an analysis of the type of conflicting handovers of the device between the first cell and the second cell, the first performance indicators, the second performance indicators, and/or the third performance indicators. For instance, the CH identifier component can communicate conflicting handovers type information to the CH mitigator component to inform the CH mitigator of the type of conflicting handovers of the device have been predicted or determined. In response to receiving the conflicting handovers type information, the CH mitigator component can determine which of the first cell or the second cell is the more desirable (e.g., better, more suitable, or optimal) cell to which the device is to be connected based at least in part on the group of rules and the results of the analysis of the type of conflicting handovers of the device between the first cell and the second cell, the first performance indicators, the second performance indicators, and/or the third performance indicators.

In response to determining that the device is to be connected to the first cell because the first cell is the more desirable (e.g., better or best) cell to which to connect the device, at 1108, instructions can be communicated to the first cell and/or the second cell to instruct or indicate to the first cell and/or the second cell that the device is to be connected to the first cell and is to be prevented from handover from the first cell to the second cell for at least a defined amount of time. For instance, if the CH mitigator component determines that the first cell is the more desirable cell, and, accordingly, the device is to be connected to the first cell, the CH mitigator component can communicate the instructions to the first cell and/or the second cell to instruct or indicate to the first cell and/or the second cell that the device is to be connected to the first cell and is to be prevented from handover or steering from the first cell to the second cell for at least the defined amount of time.

Figure 12:
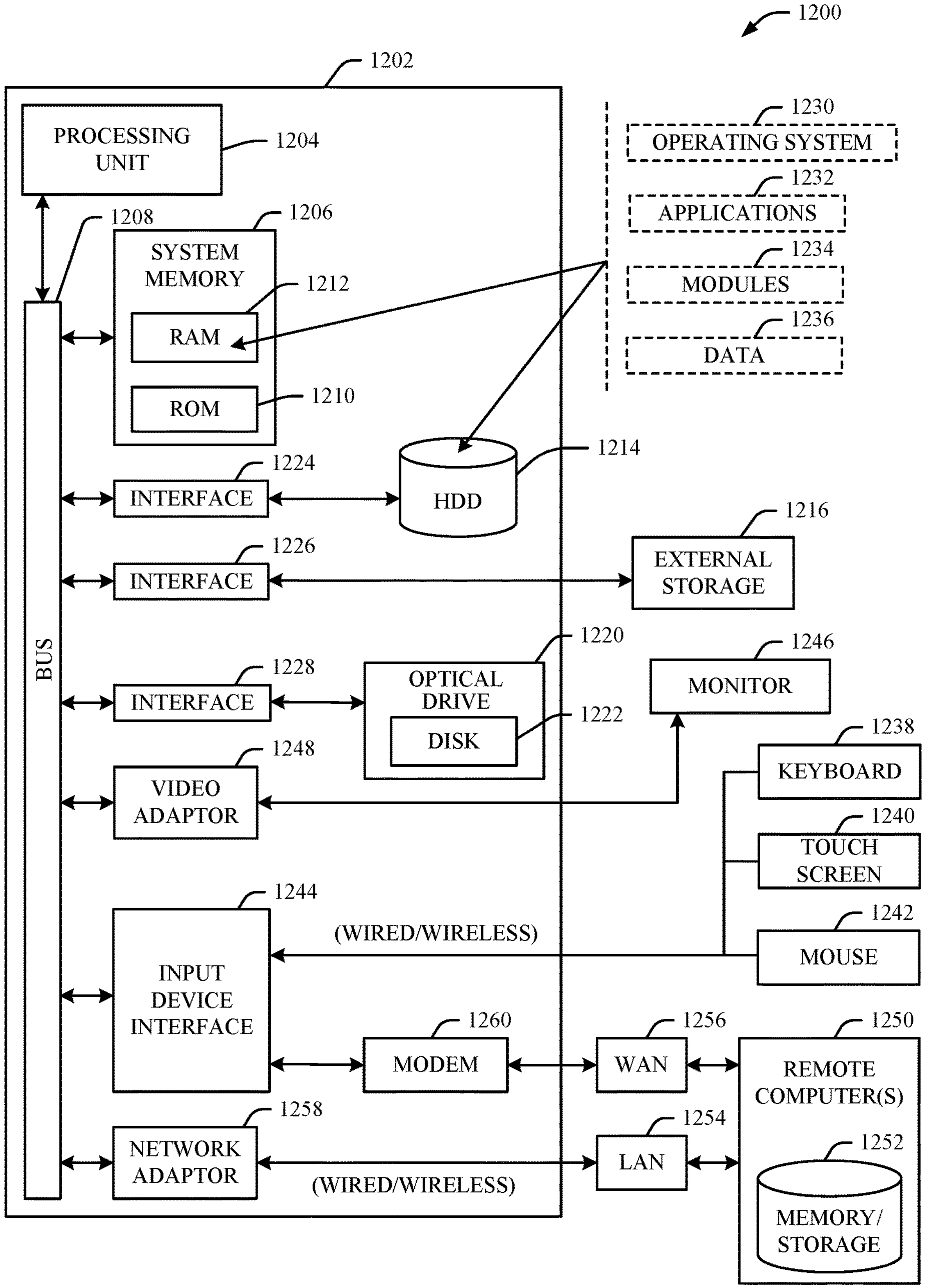
FIG. 12 illustrates an example block diagram of an example computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), IoT device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, UE, communication network, core network, RAN, base station, handover management component, CH detector component, CH identifier component, CH mitigator component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

determining, by a system comprising at least one processor, that there are conflicting handovers of a device between a first cell and a second cell based on handover information relating to previous handovers of the device, first performance indicators associated with the device and the first cell, and second performance indicators associated with the device and the second cell, over a defined time period; and in response to determining that there are the conflicting handovers of the device between the first cell and the second cell, from a group of types of conflicting handovers of devices, predicting, by the system, a type of the conflicting handovers of the device between the first cell and the second cell based on the handover information, the first performance indicators, and the second performance indicators.

2. The method of claim 1, wherein the group of types of conflicting handovers of devices comprises a first type of conflicting handovers of devices relating to downlink and uplink performance associated with the device with respect to the first cell and the second cell, a second type of conflicting handovers of devices relating to a quality of service associated with the device with respect to the first cell and the second cell, and a third type of conflicting handovers of devices relating to load balancing associated with one of the first cell or the second cell, and the quality of service associated with the device and another one of the first cell or the second cell.

3. The method of claim 1, wherein the device is a first device, wherein the determining comprises determining that there are the conflicting handovers of the first device between the first cell and the second cell based on the handover information, the first performance indicators, the second performance indicators, and third performance indicators associated with one or more second devices associated with the first cell, or wherein the predicting comprises: from the group of types of conflicting handovers of devices, predicting the type of the conflicting handovers of the first device between the first cell and the second cell based on the handover information, the first performance indicators, the second performance indicators, and the third performance indicators.

4. The method of claim 1, wherein the device is a first device, and wherein the method further comprises:

determining, by the system, which cell of a group of cells, comprising the first cell and the second cell, the first device is to be connected based on a group of rules and based on the predicting of the type of the conflicting handovers of the first device, the first performance indicators, the second performance indicators, or third performance indicators associated with one or more second devices associated with the first cell, wherein the group of rules is usable to indicate which of the first cell and the second cell the first device is to be connected; and in response to determining that the first device is to be connected to the first cell, prohibiting, by the system, a handover of the first device from the first cell to the second cell or a third cell of the group of cells, due to a subsequent conflicting handover of the type of the conflicting handovers, for a specified period of time.

5. The method of claim 4, wherein the group of rules comprises a rule relating to overall performance values, and wherein the determining that the first device is to be connected to the first cell comprises determining that the first device is to be connected to the first cell based on the rule relating to the overall performance values and based on determining that a first overall performance value associated with the first device and the first cell is higher than a second overall performance value associated with the first device and the second cell.

6. The method of claim 1, wherein the device is a first device, and wherein the method further comprises:

analyzing, using a machine learning model of the system, the handover information, the first performance indicators, the second performance indicators, or third performance indicators associated with one or more second devices associated with the first cell; and based on the analyzing, identifying, using the machine learning model of the system, a pattern in the handover information, the first performance indicators, the second performance indicators, or the third performance indicators, wherein the machine learning model is trained to learn to identify patterns relating to previous conflicting handovers of one or more third devices between cells based on training information relating to the previous conflicting handovers of the one or more third devices between the cells, and wherein the determining that there are the conflicting handovers of the first device between the first cell and the second cell comprises determining, using the machine learning model of the system, that there are the conflicting handovers of the first device between the first cell and the second cell based on the learning and based on the pattern being determined to indicate that the conflicting handovers of the first device between the first cell and the second cell has occurred or is occurring.

7. The method of claim 1, wherein the device is a first device, and wherein the method further comprises:

analyzing, using a machine learning model of the system, the handover information, the first performance indicators, the second performance indicators, or third performance indicators associated with one or more second devices associated with the first cell; and based on the analyzing, identifying, using the machine learning model of the system, a pattern in the handover information, the first performance indicators, the second performance indicators, or the third performance indicators, wherein the machine learning model is trained to learn to identify respective patterns relating to respective types of conflicting handovers of devices of the group of conflicting handovers of devices based on training information relating to the respective types of conflicting handovers of devices, and wherein the predicting comprises predicting, using the machine learning model of the system, the type of the conflicting handovers of the first device between the first cell and the second cell based on the learning and based on the pattern in relation to the respective patterns relating to the respective types of conflicting handovers of devices.

8. The method of claim 7, wherein the respective types of conflicting handovers of devices comprise a first type of conflicting handovers of devices and a second type of conflicting handovers of devices, and wherein the method further comprises:

determining, using the machine learning model of the system, a first probability value that the first device is experiencing the first type of conflicting handovers of devices based on the pattern in relation to the respective patterns relating to the respective types of conflicting handovers of devices; and determining, using the machine learning model of the system, a second probability value that the first device is experiencing the second type of conflicting handovers of devices based on the pattern in relation to the respective patterns relating to the respective types of conflicting handovers of devices, wherein the predicting comprises predicting that the first device is experiencing the first type of conflicting handovers of devices based on the first probability value being determined to be higher than the second probability value.

9. The method of claim 1, wherein the determining comprises determining that there are the conflicting handovers of the device between the first cell, the second cell, and a third cell based on the handover information relating to the previous handovers of the device, the first performance indicators, the second performance indicators, third performance indicators associated with the device and the third cell, or fourth performance indicators associated with one or more second devices associated with the first cell, over a defined time period.

10. The method of claim 1, wherein the predicting comprises the type of the conflicting handovers of the device between the first cell, the second cell, and a third cell based on the handover information relating to the previous handovers of the device, the first performance indicators, the second performance indicators, third performance indicators associated with the device and the third cell, or fourth performance indicators associated with one or more second devices associated with the first cell, over a defined time period.

11. The method of claim 1, wherein the first performance indicators comprise or relate to an uplink signal-to-interference-plus-noise ratio, a downlink signal-to-interference-plus-noise ratio, a reference signal received power, a reference signal received quality, an uplink data throughput, a downlink data throughput, a quality of service, a bandwidth, a delay, a jitter, a data packet loss rate, or a data packet retransmission rate associated with the device.

12. A system, comprising:

at least one memory that stores computer executable components; and at least one processor that executes computer executable components stored in the at least one memory, wherein the computer executable components comprise:

a conflicting handovers detector that detects conflicting user equipment handovers of a user equipment between first network equipment and second network equipment based on handover data relating to previous user equipment handovers of the user equipment, first performance indicators associated with the user equipment and the first network equipment, and second performance indicators associated with the user equipment and the second network equipment, over a defined time period; and a conflicting handovers identifier that, in response to detection of the conflicting user equipment handovers of the user equipment between the first network equipment and the second network equipment, predicts, from a group of types of conflicting user equipment handovers, a type of the conflicting user equipment handovers of the user equipment between the first network equipment and the second network equipment based on the handover data, the first performance indicators, and the second performance indicators.

13. The system of claim 12, wherein the group of types of conflicting user equipment handovers comprises a first type of conflicting user equipment handovers relating to downlink and uplink performance associated with the user equipment with respect to the first network equipment and the second network equipment, a second type of conflicting user equipment handovers relating to a quality of service associated with the user equipment with respect to the first network equipment and the second network equipment, or a third type of conflicting user equipment handovers relating to load balancing associated with one of the first network equipment or the second network equipment, and the quality of service associated with the user equipment and another one of the first network equipment or the second network equipment.

14. The system of claim 12, wherein the user equipment is a first user equipment, wherein the conflicting handover detector detects the conflicting user equipment handovers of the first user equipment between the first network equipment and the second network equipment based on the handover data, the first performance indicators, the second performance indicators, and third performance indicators associated with one or more second user equipment associated with the first network equipment, or wherein the conflicting handovers identifier predicts, from the group of types of conflicting user equipment handovers, the type of the conflicting user equipment handovers of the first user equipment between the first network equipment and the second network equipment based on the handover data, the first performance indicators, the second performance indicators, and the third performance indicators.

15. The system of claim 12, wherein the user equipment is a first user equipment, wherein the computer executable components comprise:

a conflicting handovers mitigator that determines which network equipment of a group of network equipment, comprising the first network equipment and the second network equipment, the first user equipment is to be connected based on a group of rules and based on the prediction of the type of the conflicting user equipment handovers of the first user equipment, the first performance indicators, the second performance indicators, or third performance indicators associated with one or more second user equipment associated with the first network equipment, wherein the group of rules indicates which of the network equipment the first user equipment is to be connected, wherein, in response to determining that the first user equipment is to be connected to the first network equipment, the conflicting handovers mitigator restricts a handover of the first user equipment from the first network equipment to at least the second network equipment, due to a subsequent conflicting user equipment handover of the type of the conflicting user equipment handovers, for a specified period of time.

16. The system of claim 12, wherein the user equipment is a first user equipment, wherein the conflicting handovers detector employs a machine learning model that performs a machine learning-based analysis on the handover data, the first performance indicators, the second performance indicators, or third performance indicators associated with one or more second user equipment associated with the first network equipment, wherein, based on the machine learning-based analysis, the machine learning model identifies or determines a pattern in the handover data, the first performance indicators, the second performance indicators, or the third performance indicators, wherein the machine learning model is trained to learn to identify or determine patterns relating to previous conflicting user equipment handovers of one or more third user equipment between respective network equipment based on training data relating to the previous conflicting user equipment handovers of the one or more third user equipment between the respective network equipment, and wherein the machine learning model determines that there are the conflicting user equipment handovers of the first user equipment between the first network equipment and the second network equipment based on the learning and based on the pattern being determined to indicate that the conflicting user equipment handovers of the first user equipment between the first network equipment and the second network equipment has occurred or is occurring.

17. The system of claim 12, wherein the user equipment is a first user equipment, wherein the conflicting handovers identifier employs a machine learning model that performs a machine learning-based analysis on the handover data, the first performance indicators, the second performance indicators, or third performance indicators associated with one or more second user equipment associated with the first network equipment, based on the machine learning-based analysis, the machine learning model identifies or determines a pattern in the handover data, the first performance indicators, the second performance indicators, or the third performance indicators, wherein the machine learning model is trained to learn to identify or determine respective patterns relating to respective types of conflicting user equipment handovers of the group of conflicting user equipment handovers based on training data relating to the respective types of conflicting user equipment handovers, and wherein the machine learning model predicts the type of the conflicting user equipment handovers of the first user equipment between the first network equipment and the second network equipment based on the learning and based on the pattern in relation to the respective patterns relating to the respective types of conflicting user equipment handovers.

18. The system of claim 12, wherein the first performance indicators comprise or relate to an uplink signal-to-interference-plus-noise ratio, a downlink signal-to-interference-plus-noise ratio, a reference signal received power, a reference signal received quality, an uplink data throughput, a downlink data throughput, a quality of service, a bandwidth, a delay, a jitter, a data packet loss rate, or a data packet retransmission rate associated with the user equipment.

19. A non-transitory machine-readable medium, comprising executable instructions that, when executed by at least one processor, facilitate performance of operations, comprising:

determining that there are conflicting handovers of a device between a first base station and a second base station based on handover information relating to previous handovers of the device, first performance indicators associated with the device and the first base station, and second performance indicators associated with the device and the second base station, over a defined time period; and in response to determining that there are the conflicting handovers of the device between the first base station and the second base station, from a group of types of conflicting handovers of devices, predicting a type of the conflicting handovers of the device between the first base station and the second base station based on the handover information, the first performance indicators, and the second performance indicators.

20. The non-transitory machine-readable medium of claim 19, wherein the device is a first device, and wherein the operations further comprise:

determining which base station of a group of base stations, comprising the first base station and the second base station, the first device is to be connected based on a group of rules and based on the predicting of the type of the conflicting handovers of the first device, the first performance indicators, the second performance indicators, or third performance indicators associated with one or more second devices associated with the first base station, wherein the group of rules is usable to indicate which of the first base station and the second base station the first device is to be connected; and in response to determining that the first device is to be connected to the first base station, banning, by the system, a handover of the first device from the first base station to the second base station or a third base station of the group of base stations, due to a subsequent conflicting handover of the type of the conflicting handovers, for a specified period of time.

* * * * *